(12) United States Patent
Su et al.

(10) Patent No.: US 10,863,501 B2
(45) Date of Patent: Dec. 8, 2020

(54) DEVICE-TO-DEVICE COMMUNICATION METHOD, ACCESS POINT, AND FIRST STATION

(71) Applicant: HUAWEI TECHNOLOGIES CO., LTD., Shenzhen (CN)

(72) Inventors: Hongjia Su, Shanghai (CN); Jun Zhu, Shanghai (CN); Yingpei Lin, Shanghai (CN); Dengyu Qiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/010,513

(22) Filed: Jun. 17, 2018

(65) Prior Publication Data

US 2018/0295619 A1    Oct. 11, 2018

Related U.S. Application Data

(63) Continuation of application No. PCT/CN2016/098368, filed on Sep. 7, 2016.

(30) Foreign Application Priority Data

Dec. 18, 2015   (CN) .......................... 2015 1 0957695

(51) Int. Cl.
*H04W 72/04* (2009.01)
*H04W 76/14* (2018.01)
(Continued)

(52) U.S. Cl.
CPC ..... *H04W 72/0446* (2013.01); *H04W 72/042* (2013.01); *H04W 76/14* (2018.02);
(Continued)

(58) Field of Classification Search
CPC .......... H04W 72/0413; H04W 72/042; H04W 72/0446; H04W 92/18; H04W 88/08; H04W 76/14
See application file for complete search history.

(56) References Cited

U.S. PATENT DOCUMENTS

2008/0273507 A1   11/2008 Sharma
2012/0106452 A1    5/2012 Kneckt et al.
(Continued)

FOREIGN PATENT DOCUMENTS

CN          102415161 A     4/2012
CN          103312726 A     9/2013
(Continued)

OTHER PUBLICATIONS

IEEE Computer Society, "Part 11: Wireless LAN Medium Access Control (MAC) and Physical Layer (PHY) Specifications Amendment 4: Enhancements for Very High Throughput for Operation in Bands below 6 GHz", Dec. 18, 2013, IEEE Std 802.11ac™-2013, pp. 1-425 (Year: 2013).*
(Continued)

*Primary Examiner* — Paul H Masur
(74) *Attorney, Agent, or Firm* — Kilpatrick Townsend & Stockton LLP

(57) ABSTRACT

The present invention provides a device-to-device communication method, an access point, and a first station, to reduce channel contention overheads of device-to-device communication, and improve a system throughput rate. The method includes: determining, by an access point, a time window used for device-to-device communication between stations; and sending, by the access point, a downlink frame including the time window, where the downlink frame is configured to instruct a station having a device-to-device
(Continued)

communication capability to perform device-to-device communication within the time window.

24 Claims, 15 Drawing Sheets

(51) Int. Cl.
*H04W 88/08* (2009.01)
*H04W 92/18* (2009.01)

(52) U.S. Cl.
CPC ........ *H04W 72/0413* (2013.01); *H04W 88/08* (2013.01); *H04W 92/18* (2013.01)

(56) References Cited

U.S. PATENT DOCUMENTS

| | | | |
|---|---|---|---|
| 2013/0178221 A1 | 7/2013 | Jung et al. | |
| 2013/0258996 A1 | 10/2013 | Jung et al. | |
| 2013/0308549 A1 | 11/2013 | Madan et al. | |
| 2014/0112226 A1 | 4/2014 | Jafarian et al. | |
| 2014/0301294 A1* | 10/2014 | Kwon | H04W 76/14 370/329 |
| 2014/0321423 A1* | 10/2014 | Kalhan | H04W 72/0493 370/330 |
| 2015/0043558 A1 | 2/2015 | Choi et al. | |
| 2015/0271137 A1 | 9/2015 | Seok | |
| 2015/0327262 A1* | 11/2015 | Kwon | H04W 72/1289 370/329 |
| 2015/0373758 A1* | 12/2015 | Kim | H04W 8/26 370/329 |
| 2016/0219510 A1* | 7/2016 | Asterjadhi | H04W 52/0274 |
| 2016/0219512 A1* | 7/2016 | Asterjadhi | H04W 52/0274 |
| 2016/0219522 A1* | 7/2016 | Asterjadhi | H04W 52/0274 |
| 2016/0316487 A1* | 10/2016 | Kalhan | H04W 72/1278 |
| 2018/0132175 A1* | 5/2018 | Choi | H04W 52/02 |

FOREIGN PATENT DOCUMENTS

| | | |
|---|---|---|
| CN | 103686934 A | 3/2014 |
| CN | 104205984 A | 12/2014 |
| CN | 104756560 A | 7/2015 |
| JP | 2015534796 A | 12/2015 |
| KR | 20130109781 A | 10/2013 |
| KR | 20140058366 A | 5/2014 |
| WO | 2013074462 A1 | 5/2013 |
| WO | 2013141669 A1 | 9/2013 |
| WO | 2015095580 A1 | 6/2015 |

OTHER PUBLICATIONS

Samsung:"Mode 1 resource allocation for D2D broadcast communication", 3GPP TSG RAN WG1 Meeting #76bis, R1-141307, Shenzen, P. R. China, Mar. 31-Apr. 4, 2014. total 5 pages. XP050786979.

* cited by examiner

An access point determines a time window used for device-to-device communication between stations — S201

The access point sends a downlink frame including the time window, where the downlink frame is used to instruct a station having a device-to-device communication capability to perform device-to-device communication within the time window — S202

DEVICE-TO-DEVICE COMMUNICATION METHOD, ACCESS POINT, AND FIRST STATION

CROSS-REFERENCE TO RELATED APPLICATIONS

This application is a continuation of International Application No. PCT/CN2016/098368, filed on Sep. 7, 2016, which claims priority to Chinese Patent Application No. 201510957695.7, filed on Dec. 18, 2015. The disclosures of the aforementioned applications are hereby incorporated by reference in their entireties.

TECHNICAL FIELD

The present invention relates to the field of wireless communications, and in particular, to a device-to-device communication method, an access point, and a first station.

BACKGROUND

A device-to-device (Device-to-Device, D2D) communication technology is a technology that allows terminals to directly communicate with each other. The technology can increase spectral efficiency of a communications system, reduce transmit powers of the terminals, resolve an insufficient spectral resource problem of a wireless communications system to some extent, and greatly improve network-wide system performance. A link used for device-to-device communication between two stations is referred to as a direct station-to-station link (Direct STA-to-STA Link, DSSL).

In existing device-to-device communication, a carrier sense multiple access (Carrier Sense Multiple Access, CSMA) mechanism is used, and its core is carrier sense. A station determines that a channel is in an idle state by means of carrier sense, and then contends for the channel. Only a station that has a device-to-device communication capability and obtains the channel by means of contention can perform device-to-device communication. After determining that a channel is in an idle state, both a station having a device-to-device communication capability and a station that does not have a device-to-device communication capability can contend for the channel, causing contention overheads during a channel contention process.

Particularly, in a scenario with dense stations, there are relatively high requirements for device-to-device communication and conventional uplink/downlink communication. Consequently, contention overheads generated when stations contend for a channel greatly increase, affecting a system throughput rate.

SUMMARY

Embodiments of the present invention provide a device-to-device communication method, an access point, and a first station, to reduce channel contention overheads of device-to-device communication, and improve a system throughput rate.

According to a first aspect, an embodiment of the present invention provides a device-to-device communication method, including:

determining, by an access point, a time window used for device-to-device communication between stations; and sending, by the access point, a downlink frame including the time window, where the downlink frame is configured to instruct a station having a device-to-device communication capability to perform device-to-device communication within the time window.

With reference to the first aspect, in a first possible implementation, the downlink frame further includes any one or a combination of the following:

an identifier indicating a station performing device-to-device communication within the time window, resource configuration information of the time window, or a type of device-to-device communication performed within the time window; and the type of device-to-device communication includes DSSL discovery, DSSL link setup, and DSSL data exchange.

With reference to the first aspect or the first possible implementation of the first aspect, in a second possible implementation of the first aspect, the method further includes:

sending, by the access point, a target wake time TWT frame, where the TWT frame is used to instruct a station having a device-to-device communication capability to receive, at a preset moment, the downlink frame sent by the access point.

With reference to the first aspect, or the first or the second possible implementation of the first aspect, in a third possible implementation of the first aspect, the method further includes:

staying in, by the access point, a dormant state within the time window.

According to a second aspect, an embodiment of the present invention provides a device-to-device communication method, including:

receiving, by a first station, a downlink frame that is sent by an access point and includes a time window, where the downlink frame is configured to instruct a station having a device-to-device communication capability to perform device-to-device communication within the time window, and the first station has a device-to-device communication capability; and performing, by the first station, device-to-device communication within the time window.

With reference to the second aspect, in a first possible implementation, the downlink frame further includes any one or a combination of the following:

an identifier of the first station, resource configuration information used to instruct the first station to perform device-to-device communication within the time window, or a type of device-to-device communication performed by the first station within the time window; and the type of device-to-device communication includes DSSL discovery, DSSL link setup, and DSSL data exchange.

With reference to the second aspect or the first possible implementation of the second aspect, in a second possible implementation of the second aspect, the method further includes:

receiving, by the first station, a target wake time TWT frame sent by the access point, where the TWT frame is used to instruct the first station to receive, at a preset moment, the downlink frame sent by the access point.

With reference to the second aspect, or the first or the second possible implementation of the second aspect, in a third possible implementation of the second aspect, the performing, by the first station, device-to-device communication within the time window includes:

contending for, by the first station, a channel within the time window by using a preset backoff time and a preset backoff window, where the preset backoff time is greater than a short inter-frame space SIFS, and is less than a distributed inter-frame space DIFS; and performing, by the first station, device-to-device communication within the time window on the channel obtained by means of contention.

With reference to any one of the second aspect, or the first to the third possible implementations of the second aspect, in a fourth possible implementation of the second aspect, a communications frame that is sent by the first station to a peer station in a process of performing device-to-device communication within the time window includes information used to indicate a frame type of the communications frame.

With reference to any one of the second aspect, or the first to the fourth possible implementations of the second aspect, in a fifth possible implementation of the second aspect, the performing, by the first station, device-to-device communication within the time window further includes:

sending, by the first station, a device-to-device communication end frame to the access point, where the device-to-device communication end frame is used to indicate that current device-to-device communication of the first station ends.

According to a third aspect, an embodiment of the present invention provides an access point, including:

a processing unit, configured to determine a time window used for device-to-device communication between stations; and a transceiver unit, configured to send a downlink frame including the time window determined by the processing unit, where the downlink frame is configured to instruct a station having a device-to-device communication capability to perform device-to-device communication within the time window.

With reference to the third aspect, in a first possible implementation, the downlink frame further includes any one or a combination of the following:

an identifier indicating a station performing device-to-device communication within the time window, resource configuration information of the time window, or a type of device-to-device communication performed within the time window; and the type of device-to-device communication includes DSSL discovery, DSSL link setup, and DSSL data exchange.

With reference to the third aspect or the first possible implementation of the third aspect, in a second possible implementation of the third aspect, the transceiver unit is further configured to:

send a target wake time TWT frame, where the TWT frame is used to instruct a station having a device-to-device communication capability to receive, at a preset moment, the downlink frame sent by the transceiver unit.

With reference to the third aspect, or the first or the second possible implementation of the third aspect, in a third possible implementation of the third aspect, the processing unit is further configured to:

control the access point to stay in a dormant state within the time window.

According to a fourth aspect, an embodiment of the present invention provides a first station, including:

a transceiver unit, configured to receive a downlink frame that is sent by an access point and includes a time window, where the downlink frame is configured to instruct a station having a device-to-device communication capability to perform device-to-device communication within the time window, and the first station has a device-to-device communication capability; and a processing unit, configured to control the first station to perform device-to-device communication within the time window received by the transceiver unit.

With reference to the fourth aspect, in a first possible implementation, the downlink frame further includes any one or a combination of the following:

an identifier of the first station, resource configuration information used to instruct the first station to perform device-to-device communication within the time window, or a type of device-to-device communication performed by the first station within the time window; and the type of device-to-device communication includes DSSL discovery, DSSL link setup, and DSSL data exchange.

With reference to the fourth aspect or the first possible implementation of the fourth aspect, in a second possible implementation of the fourth aspect, the transceiver unit is further configured to:

receive a target wake time TWT frame sent by the access point, where the TWT frame is used to instruct the transceiver unit to receive, at a preset moment, the downlink frame sent by the access point.

With reference to the fourth aspect, or the first or the second possible implementation of the fourth aspect, in a third possible implementation of the fourth aspect, when the first station performs device-to-device communication within the time window, the processing unit is further configured to:

contend for a channel within the time window by using a preset backoff time and a preset backoff window, where the preset backoff time is greater than a short inter-frame space SIFS, and is less than a distributed inter-frame space DIFS; and control the first station to perform device-to-device communication within the time window on the channel obtained by means of contention.

With reference to any one of the fourth aspect, or the first to the third possible implementations of the fourth aspect, in a fourth possible implementation of the fourth aspect, when the first station performs device-to-device communication within the time window, the transceiver unit is further configured to:

send a communications frame to a peer station performing device-to-device communication with the first station, where the communications frame includes information used to indicate a frame type of the communications frame.

With reference to any one of the fourth aspect, or the first to the fourth possible implementations of the fourth aspect, in a fifth possible implementation of the fourth aspect, when the first station performs device-to-device communication within the time window, the transceiver unit is further configured to:

send a device-to-device communication end frame to the access point, where the device-to-device communication end frame is used to indicate that current device-to-device communication of the first station ends.

According to a fifth aspect, an embodiment of the present invention provides a network allocation vector NAV setting method, including:

obtaining, by a second station, a time window that is determined by an access point and used for device-to-device communication between stations, where the second station does not have a device-to-device communication capability; and setting, by the second station, an NAV as the time window, where the NAV is used to indicate that a channel is in a busy state within the time window.

With reference to the fifth aspect, in a first possible implementation, the obtaining, by a second station, a time window that is determined by an access point and used for device-to-device communication between stations includes:

receiving, by the second station, a downlink frame that is sent by the access point and includes the time window.

With reference to the fifth aspect, in a second possible implementation, the obtaining, by a second station, a time window that is determined by an access point and used for device-to-device communication between stations includes:

listening to, by the second station, an uplink frame that is sent by a station having a device-to-device communication capability to the access point, where the uplink frame includes the time window.

According to a sixth aspect, an embodiment of the present invention provides a second station, including:

a transceiver unit, configured to obtain a time window that is determined by an access point and used for device-to-device communication between stations, where the second station does not have a device-to-device communication capability; and a processing unit, configured to set an NAV as the time window obtained by the transceiver unit, where the NAV is used to indicate that a channel is in a busy state within the time window.

With reference to the sixth aspect, in a first possible implementation, the transceiver unit is specifically configured to:

receive a downlink frame that is sent by the access point and includes the time window.

With reference to the sixth aspect, in a second possible implementation, the transceiver unit is specifically configured to:

listen to an uplink frame that is sent by a station having a device-to-device communication capability to the access point, where the uplink frame includes the time window.

The embodiments of the present invention provide the device-to-device communication method, the access point, and the first station, so that the first station having a device-to-device communication capability performs device-to-device communication within the time window indicated by the access point, thereby avoiding channel contention between another station and the first station. In one aspect, contention overheads generated due to channel contention are reduced, device-to-device communication efficiency is improved, and a system throughput rate is improved. In another aspect, station energy consumption caused by frequent continuous channel contention is avoided, and an objective of saving station energy is achieved.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The embodiments of the present invention provide a device-to-device communication method, an access point, and a first station, to reduce channel contention overheads of device-to-device communication, and improve a system throughput rate. The method and the apparatus belong to a same inventive concept. Because problem resolving principles of the method and the apparatus are similar, mutual reference may be made to implementations of the apparatus and the method, and repeated parts are not described herein.

The embodiments of the present invention relate to a device-to-device communication technology. The device-to-device communication technology is a technology that allows terminals (stations in the present invention) to directly communicate with each other. The technology can increase spectral efficiency of a communications system, reduce transmit powers of the terminals, and resolve an insufficient spectral resource problem of a wireless communications system to some extent. The embodiments of the present invention are applicable to a wireless local area network (Wireless Local Area Network, WLAN), including but not limited to Wireless Fidelity (Wireless Fidelity, Wi-Fi) systems represented by 802.11a, 802.11b, 802.11g, 802.11n, and 802.11ac, and is particularly applicable to a scenario of dense stations. This can satisfy a requirement of a next generation Wi-Fi standard for highly-intensive users and a high throughput rate.

Figures 1, 2:
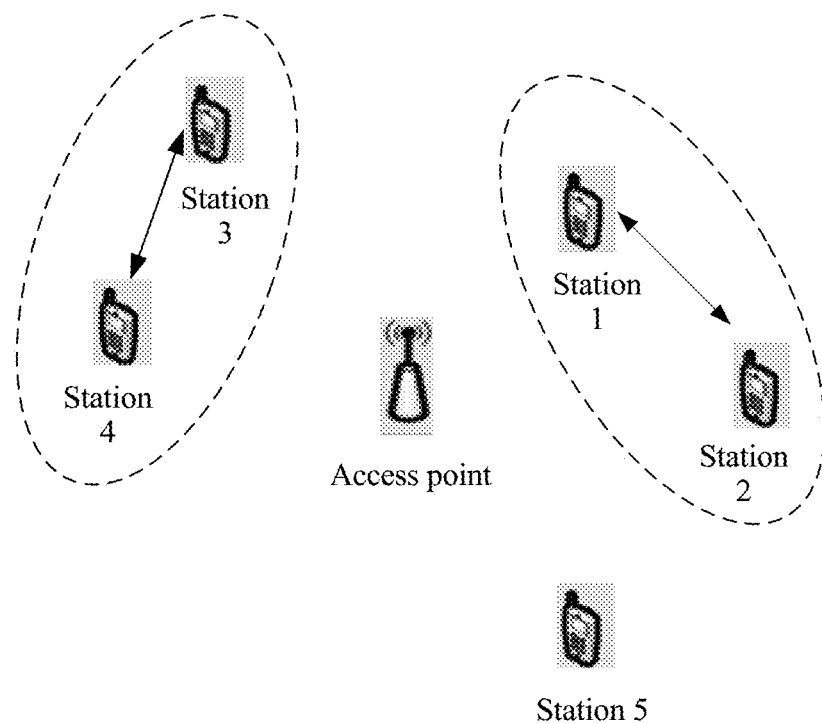
FIG. 1 is a schematic diagram of a communications network according to an embodiment of the present invention.
FIG. 2 is a schematic flowchart of a device-to-device communication method according to an embodiment of the present invention.

In a communications network shown in FIG. 1, a station 1 to a station 4 have a device-to-device communication capability, the station 1 and the station 2 are a pair of device-to-device communication stations, the station 3 and the station 4 are a pair of device-to-device communication stations, and a station 5 does not have a device-to-device communication capability. The station 1 to the station 5 all can learn a time window that is determined by an access point and used for device-to-device communication. The station 1 and the station 2 perform device-to-device communication within the time window, and the station 3 and the station 4 perform device-to-device communication within the time window. The station 5 sets a network allocation vector (Network Allocation Vector, NAV) as the time window. A channel is in a busy state within the time window specified as the NAV, and the station 5 does not contend for a channel for data sending within the time window.

The station 1 to the station 4 correspond to a first station in the embodiments of the present invention, and the station 5 corresponds to a second station in the embodiments of the present invention. Channel contention overheads are generated when a CSMA mechanism is used in device-to-device communication and uplink/downlink communication. Particularly, in a scenario of dense stations, channel contention overheads greatly increase, and the system throughput rate is affected. By means of the technical solutions provided in the embodiments of the present invention, in one aspect, contention overheads generated due to channel contention are reduced, device-to-device communication efficiency is improved, and the system throughput rate is improved; in another aspect, station energy consumption caused by frequent continuous channel contention is avoided, and an objective of saving station energy is achieved. It should be noted that in an actual application scenario, the stations in the communications network are not limited to content provided in the embodiments of the present invention.

The following describes in detail the technical solutions provided in the embodiments of the present invention.

As shown in FIG. 2, an embodiment of the present invention provides a device-to-device communication method, including:

S201. An access point determines a time window used for device-to-device communication between stations.

S202. The access point sends a downlink frame including the time window, where the downlink frame is configured to instruct a station having a device-to-device communication capability to perform device-to-device communication within the time window.

In this embodiment of the present invention, the access point determines the time window used for device-to-device communication between stations, so that a station having a device-to-device communication capability can perform device-to-device communication under the management of the access point, to improve device-to-device communication efficiency.

In some embodiments, in addition to the time window used for device-to-device communication between stations, the downlink frame sent by the access point may further include any one or a combination of the following:

an identifier indicating a station performing device-to-device communication within the time window, resource configuration information of the time window, or a type of device-to-device communication performed within the time window.

The downlink frame includes the identifier indicating the station performing device-to-device communication within the time window, so that the access point schedules the station to perform device-to-device communication within the time window.

The resource configuration information of the time window is used to indicate a resource configuration within the time window. For example, a time resource (Time Resources) within the time window is divided into multiple sub-time ranges, and multiple pairs of device-to-device communication stations perform device-to-device communication in different sub-time ranges. For example, a frequency resource (Frequency Resources) within the time window is divided into multiple sub-bandwidth resources, and multiple pairs of device-to-device communication stations perform device-to-device communication on different sub-bandwidth resources. For another example, a spatial resource (Spatial Resources) within the time window is divided into multiple sub-spatial resources, and multiple pairs of device-to-device communication stations perform device-to-device communication on different sub-spatial resources.

The type of device-to-device communication includes but is not limited to: DSSL discovery, DSSL link setup, and DSSL data exchange.

It should be noted that content included in the downlink frame sent by the access point is not limited to the content provided in this embodiment of the present invention.

The downlink frame sent by the access point may be a data frame, a control frame, or a management frame. The time window is carried in a duration (Duration) field in a Medium Access Control (Medium Access Control, MAC) header of the downlink frame. In some embodiments, the access point receives an uplink frame that is sent in response to the downlink frame by a station having a device-to-device communication capability. The uplink frame includes a time window, and the time window is carried in a Duration field in a MAC header of the uplink frame.

Description with Example 1

Figure 3:
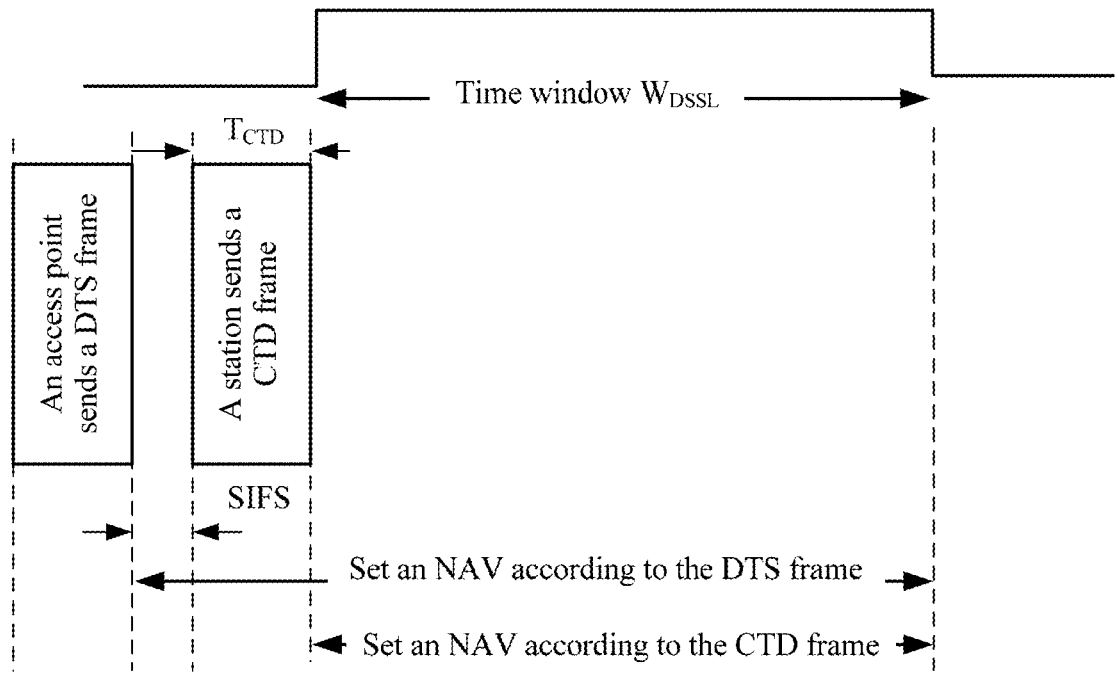
FIG. 3 is a schematic communication diagram of sending, by an access point, a DTS frame according to an embodiment of the present invention.

As shown in FIG. 3, the access point sends a DSSL to Send (DSSL to Send, DTS) frame. The DTS frame carries the time window that is determined by the access point and used for device-to-device communication between stations, and the time window is carried in a Duration field in a MAC header of the DTS frame. After a short inter-frame space (Short Inter-Frame Space, SIFS), the first station participating in device-to-device communication within the time window replies to the access point with a clear to DSSL (Clear to DSSL, CTD) frame. The CTD frame also carries the time window that is determined by the access point and used for device-to-device communication between stations, and the time window may be carried in a Duration field in a MAC header of the CTD frame.

If a station having a device-to-device communication capability receives the DTS frame sent by the access point, the station may learn that the time window $W_{DSSL}$ that is determined by the access point and used for device-to-device communication between stations is:

$$W_{DSSL}=T_{DTS\_Duration}-2*SIFS-T_{CTD}$$

$T_{DTS\_Duration}$ is a time value configured for the Duration field in the MAC header of the DTS frame. The SIFS represents a short inter-frame space, and a value is 16 μs. $T_{CTD}$ is a transmission time of the CTD frame.

If a station having a device-to-device communication capability receives the CTD frame sent by the first station, the station may also learn the time window $W_{DSSL}$ that is determined by the access point and used for device-to-device communication between stations: $W_{DSSL}=T_{CTD\_Duration}$. $T_{CTD\_Duration}$ is a time value configured for the Duration field in the MAC header of the CTD frame.

The second station that does not have a device-to-device communication capability may set an NAV of the second station according to the time value configured for the Duration field in the MAC header of the DTS frame or the time value configured for the Duration field in the MAC header of the CTD frame. That is, when the second station determines that a channel is in a busy state within the time length specified as the NAV, and the second station does not contend for the channel.

Description with Example 2

Figure 4:
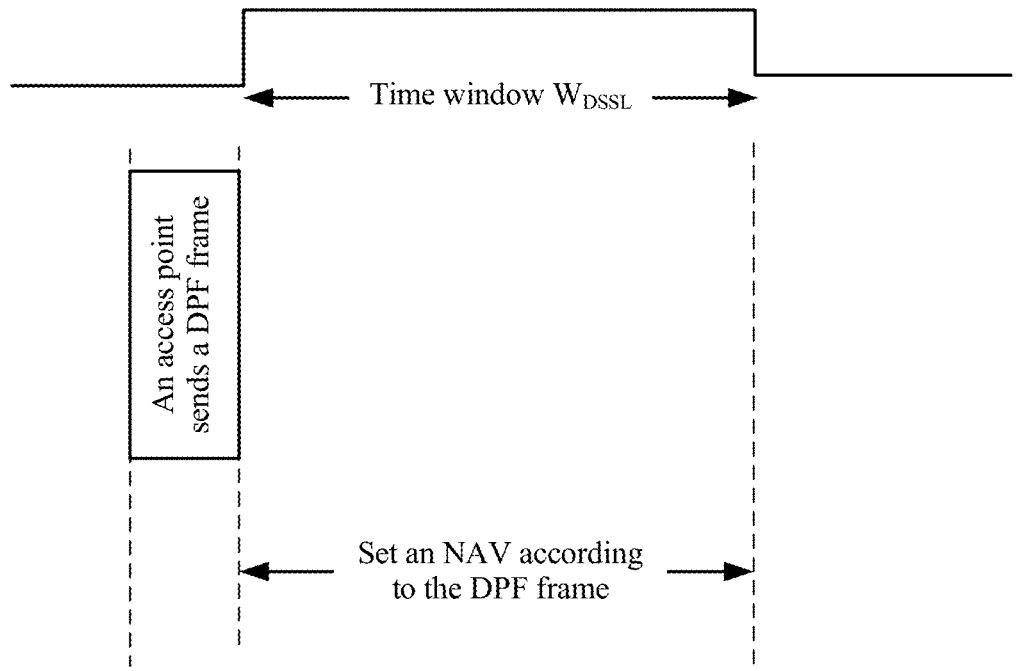
FIG. 4 is a schematic communication diagram of sending, by an access point, a DPF frame according to an embodiment of the present invention.

As shown in FIG. 4, the access point sends a DSSL polling (DSSL Polling Frame, DPF) frame. The DPF frame may use a frame format of one of a management frame, a control frame, or a data frame. The DPF frame carries the time window that is determined by the access point and used for device-to-device communication between stations. The time window is carried in a Duration field in a MAC header of the DPF frame. A time value $T_{DPF\_Duration}$ configured for the Duration field in the MAC header of the DPF frame is equal to the time window $W_{DSSL}$.

The first station having a device-to-device communication capability may learn the time window according to the DPF frame sent by the access point, and further contend for a channel, and perform device-to-device communication within the time window.

The second station that does not have a device-to-device communication capability sets an NAV of the second station as the time window according to the DPF frame sent by the access point, that is, sets the NAV of the second station to the time value configured for the Duration field in the MAC header of the DPF frame. When the second station determines that a channel is in a busy state within the time length specified as the NAV, the second station does not contend for the channel.

In this embodiment of the present invention, the access point may also indicate, by using a target wake time (Target Wake Time, TWT) mechanism, the time window used for device-to-device communication between stations and a starting moment used for sending a downlink frame by the access point.

Method 1. The access point sends a TWT frame carrying the time window used for device-to-device communication between stations. The TWT frame is used to instruct a station having a device-to-device communication capability to wake up at the starting moment of the time window, and perform device-to-device communication within the time window.

After receiving the TWT frame sent by the access point, a station supporting the TWT mechanism, that is, a station capable of identifying the TWT frame performs a corresponding operation according to an indication of the TWT frame. Specifically, the station having a device-to-device communication capability may perform device-to-device communication within the time window indicated in the TWT frame. A station that does not have a device-to-device communication capability sets an NAV of the station as the time window indicated in the TWT frame, determines that a channel is in the busy state within the time window, and does not contend for the channel.

Method 2. The access point sends a TWT frame. The TWT frame is used to instruct a station to receive, at a preset moment, the downlink frame sent by the access point. The access point sends, at the preset moment, the downlink frame carrying the time window used for device-to-device communication between stations. The downlink frame is configured to instruct a station having a device-to-device communication capability to perform device-to-device communication within the time window. For example, the downlink frame sent by the access point may be a DTS frame or a DPF frame.

After receiving the TWT frame sent by the access point, a station supporting the TWT mechanism, that is, a station capable of identifying the TWT frame receives, according to an indication of the TWT frame, the downlink frame sent by the access point. Specifically, the station having a device-to-device communication capability may perform device-to-device communication within the time window carried in the downlink frame. The station that does not have a device-to-device communication capability sets the NAV of the station as the time window carried in the downlink frame, determines that a channel is in the busy state within the time window, and does not contend for the channel. A station that does not support the TWT mechanism may directly receive the downlink frame sent by the access point.

In some embodiments, with reference to the method 1 or method 2, the TWT frame further includes the type of device-to-device communication performed within the time window. For example, information used to indicate the type of device-to-device communication performed within the time window is carried in a TWT flow identifier (Flow Identifier) information field in a request type (Request Type) information field of a TWT element (element) of the TWT frame. The TWT Flow Identifier information field includes three bits, that is, may represent eight different types of bit information. Any three types of bit information may be used to indicate DSSL discovery (DSSL Discovery), DSSL link setup (DSSL Link Setup), and DSSL data exchange (DSSL Data Exchange). The TWT Flow Identifier information field shown in Table 1 is used as an example:

TABLE 1

| Order (Order) | Bit information | Information (Meanings) indicated in bit information |
|---|---|---|
| 0 | Reserved (Reserved) | Reserved |
| 1 | Reserved | Reserved |
| 2 | 010 | DSSL Discovery |
| 3 | 011 | DSSL Link Setup |
| 4 | 100 | DSSL Data Exchange |
| 5 | Reserved | Reserved |

TABLE 1-continued

| Order (Order) | Bit information | Information (Meanings) indicated in bit information |
|---|---|---|
| 6 | Reserved | Reserved |
| 7 | Reserved | Reserved |

Figure 5:
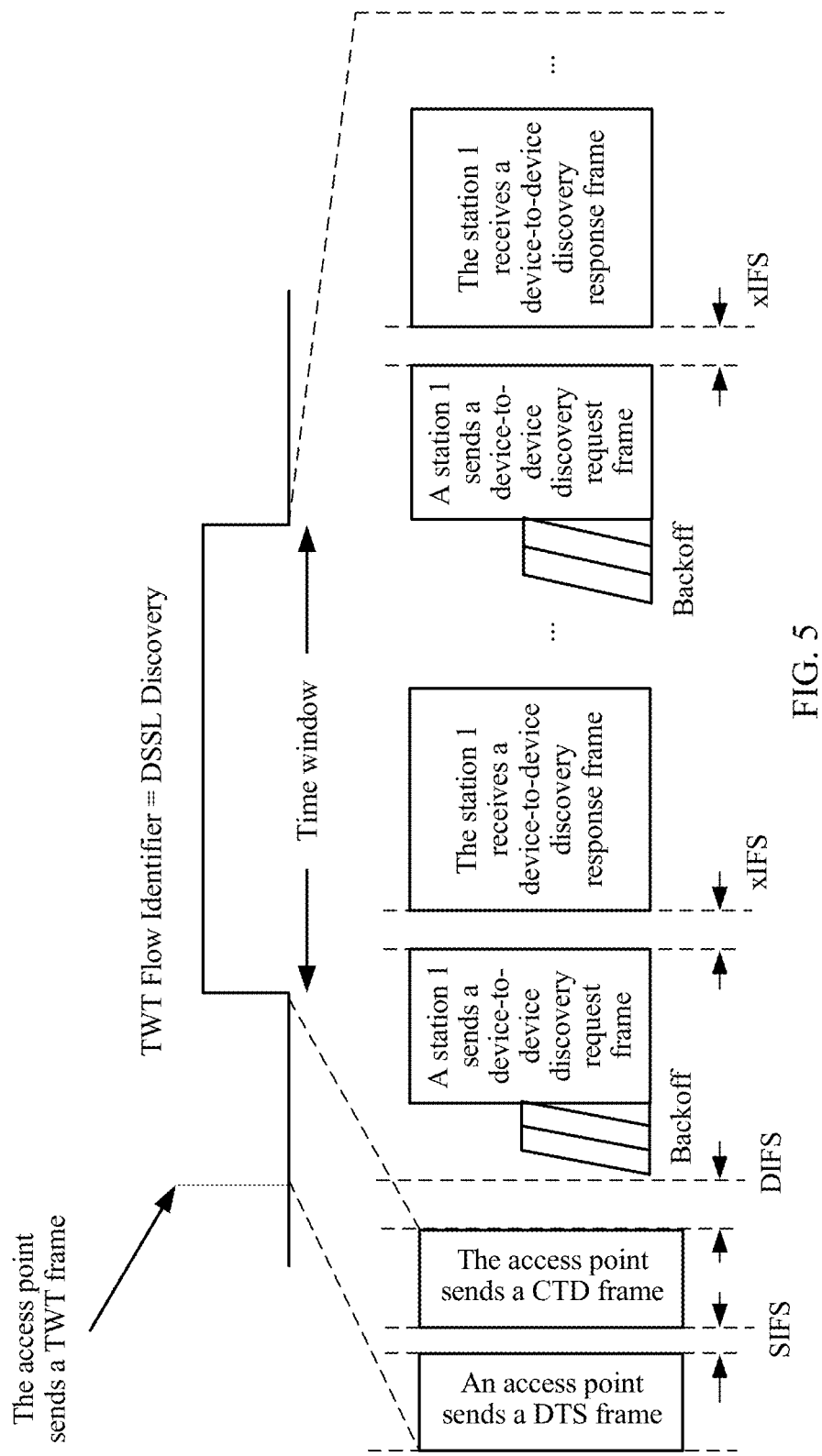
FIG. 5 is a schematic diagram of an interaction process between an access point and a station according to an embodiment of the present invention.
Figure 6:
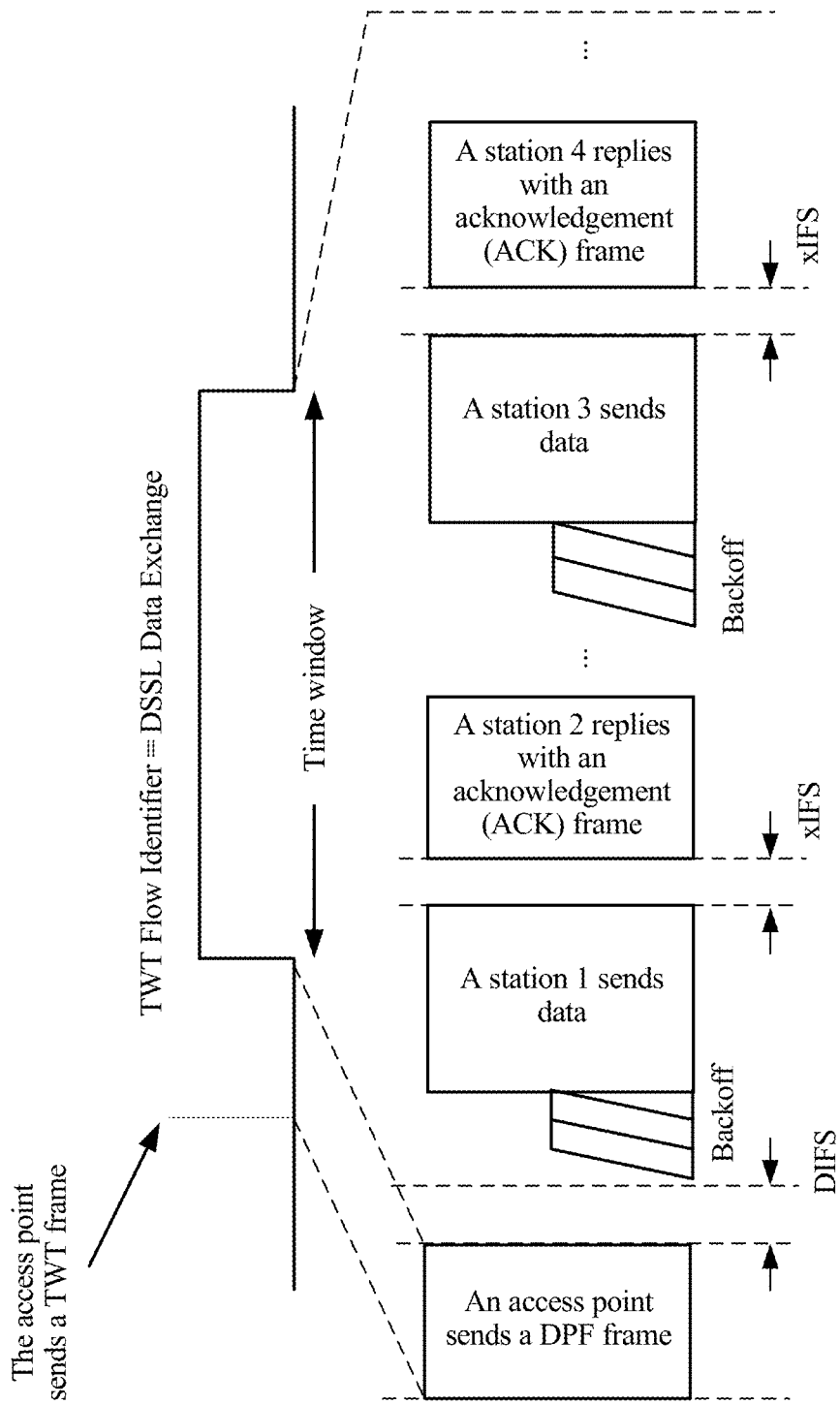
FIG. 6 is a schematic diagram of an interaction process between an access point and a station according to an embodiment of the present invention.

In Table 1, when the bit information in the TWT Flow Identifier information field is 010, it represents DSSL discovery (DSSL Discovery), and a station having a device-to-device communication capability may perform device-to-device communication station discovery within the time window. For a process of interaction between an access point and a station, refer to FIG. 5. Bit information of 011 represents DSSL link setup, and a station having a device-to-device communication capability may perform device-to-device communication link setup within the time window. Bit information of 100 represents DSSL data exchange, and a station having a device-to-device communication capability may perform a DSSL data exchange (DSSL Data Exchange) within the time window. For a process of interaction between an access point and a station, refer to FIG. 6. In FIG. 6, a station uses a channel contention mechanism.

Figure 7:
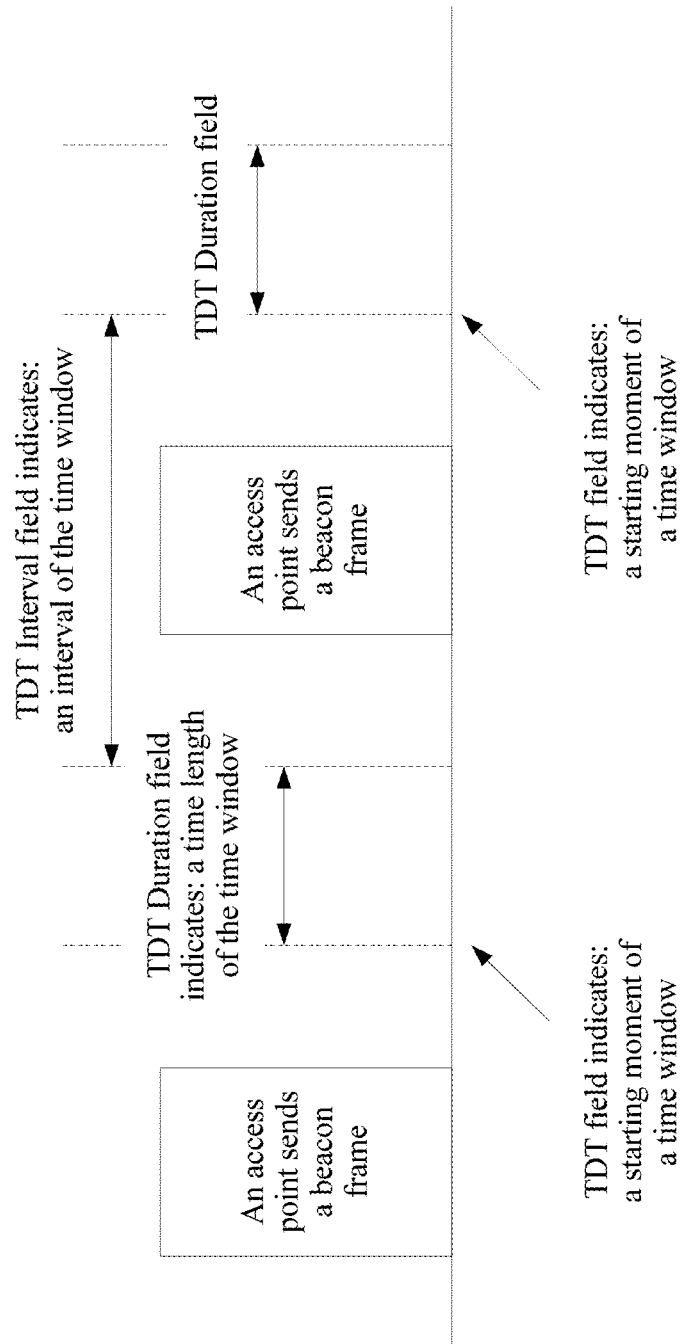
FIG. 7 is a schematic communication diagram of sending, by an access point, a beacon frame according to an embodiment of the present invention.

In this embodiment of the present invention, the access point may indicate, by using a beacon frame (Beacon), the time window used for device-to-device communication between stations. The access point sends the beacon frame, and defines a new information element (Information Element, IE) in the beacon frame. The information element may be referred to as a target DSSL time (Target DSSL Time, TDT) IE. In addition to an IE identifier (ID) field and a length (Length) field, the TDT IE further includes at least a TDT field and a TDT Duration field. The TDT field is used to indicate a starting moment of the time window used for device-to-device communication between stations, and the TDT Duration field is used to indicate a time length of the time window used for device-to-device communication. In some embodiments, the TDT IE further includes a TDT interval (Interval) field, and the TDT Interval field is used to indicate an interval between a current moment and a starting moment of the time window. For a process of sending, by the access point, the beacon frame carrying the time window, refer to FIG. 7.

A station having a device-to-device communication capability may learn, according to the beacon frame sent by the access point, the time window used for device-to-device communication between stations, and further perform device-to-device communication within the time window.

Because the TDT IE is an IE used in a device-to-device communication process, a station that does not have a device-to-device communication capability cannot obtain the time window by using the TDT IE. To resolve the problem, before the starting moment of the time window, the access point may send a control frame or a management frame in a format of the conventional 802.11 series, and adds the time window to a Duration field in a MAC header of the control frame or the management frame. The station that does not have a device-to-device communication capability may learn the time window according to the control frame or the management frame, and further set an NAV.

In this embodiment of the present invention, in addition to the time window used for device-to-device communication between stations, the downlink frame sent by the access point may further include one of or a combination of the following: an identifier indicating a station performing device-to-device communication within the time window, resource configuration information of the time window, or a type of device-to-device communication performed within the time window, to implement scheduling by the access point.

Description with Example 1

Figure 8:
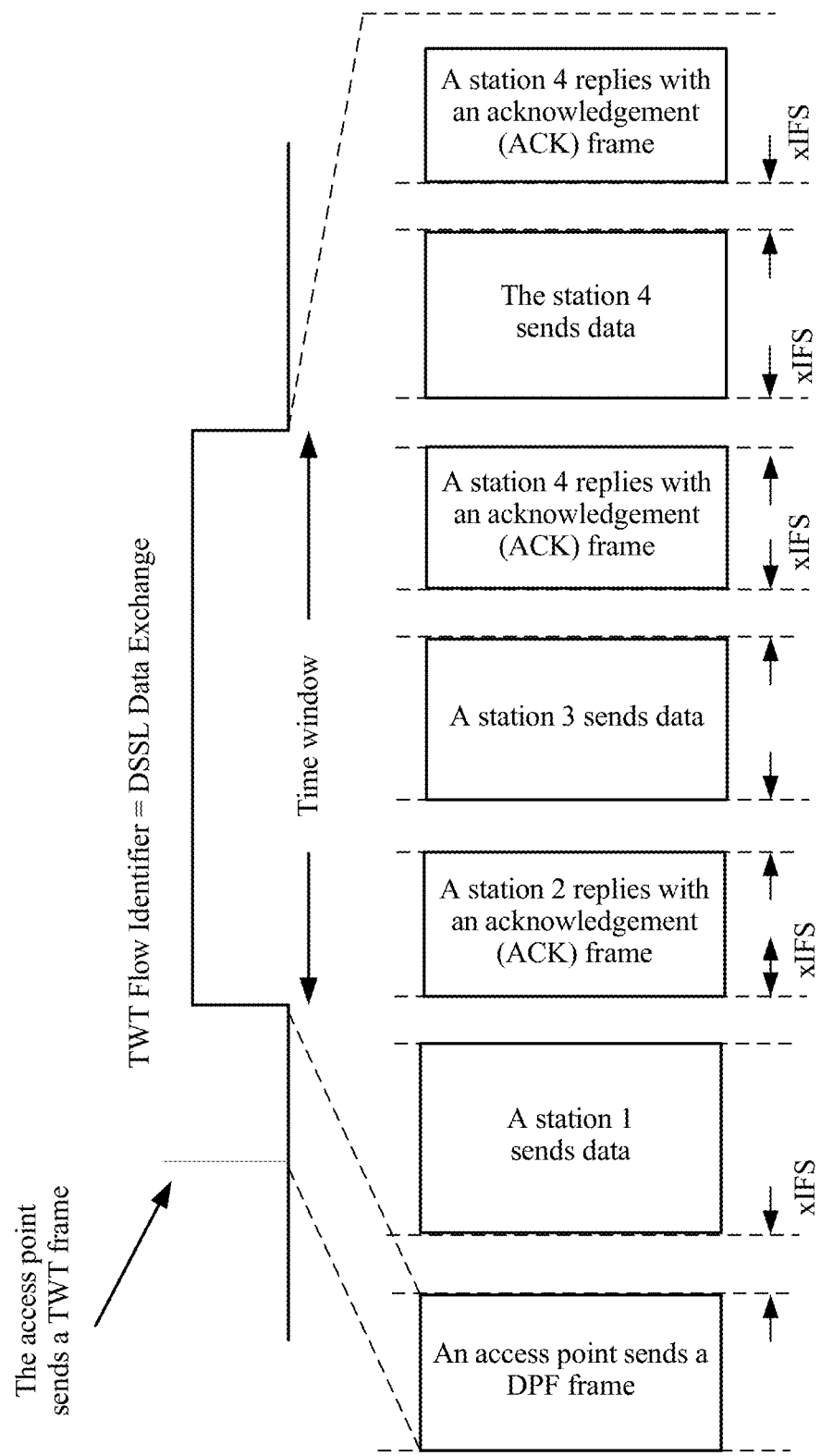
FIG. 8 is a schematic diagram of a DSSL data exchange process according to an embodiment of the present invention.

Using a DSSL data exchange process shown in FIG. 8 as an example, with reference to the TWT mechanism, the TWT frame sent by the access point includes the time window used for device-to-device communication between stations, and the TWT Flow Identifier information field of the TWT frame instructs to perform a DSSL data exchange within the time window. The TWT frame further includes an identifier of a station 1, an identifier of a station 2, an identifier of a station 3, and an identifier of a station 4, to instruct the station 1, the station 2, the station 3, and the station 4 to perform a DSSL data exchange within the time window. The station 1 and the station 2 perform a DSSL data exchange, and the station 3 and the station 4 perform a DSSL data exchange.

It should be noted that the identifier indicating the station performing device-to-device communication within the time window may be carried in the TWT frame, or may be carried in another downlink frame sent by the access point, and is not limited to the form shown in FIG. 8.

Description with Example 2

The access point adds, to the sent DPF frame, the time window used for device-to-device communication between stations, the identifier indicating the station performing device-to-device communication within the time window, and the resource configuration information of the time window.

Figure 9:
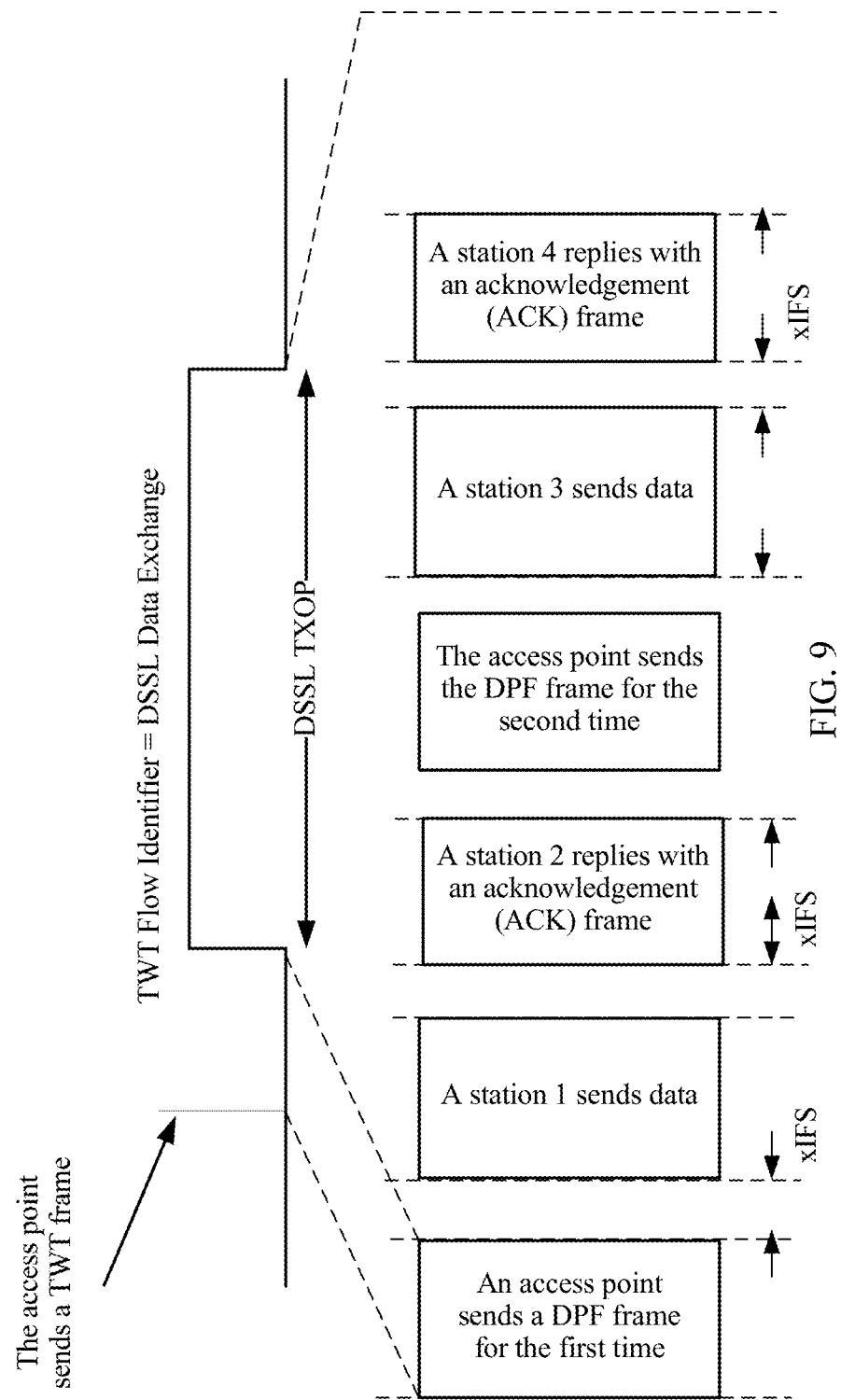
FIG. 9 is a schematic diagram of a device-to-device communication process according to an embodiment of the present invention.

Using a device-to-device communication process shown in FIG. 9 as an example, each time the access point sends one DPF frame, the access point schedules one pair of stations to perform device-to-device communication within the time window. The DPF frame that is sent by the access point for the first time includes the time window, an identifier of a station 1, an identifier of a station 2, and a resource used for performing, by the station 1 and the station 2, device-to-device communication. The station 1 and the station 2 perform device-to-device communication within the time window according to the DPF frame that is sent by the access point for the first time. The DPF frame that is sent by the access point for the second time includes the time window, an identifier of a station 3, an identifier of a station 4, and a resource used for performing, by the station 3 and the station 4, device-to-device communication. The station 3 and the station 4 perform device-to-device communication within the time window according to the DPF frame that is sent by the access point for the second time.

In this way, the access point can control more accurately each pair of stations performing device-to-device communication. For scheduling, this helps the access point perform scheduling management according to a network status. For a pair of stations performing device-to-device communication, no access point participates in a communication process. The access point may obtain related information of the pair of stations according to DSSL discovery and DSSL link setup of the pair of stations, to allocate a resource to the pair of stations. For example, the stations report, by using a mechanism such as a device-to-device communication setup request or a device-to-device communication resource request, information about a channel between the pair of stations performing device-to-device communication. The information about the channel may be obtained by means of a device-to-device communication station discovery process.

Figure 10:
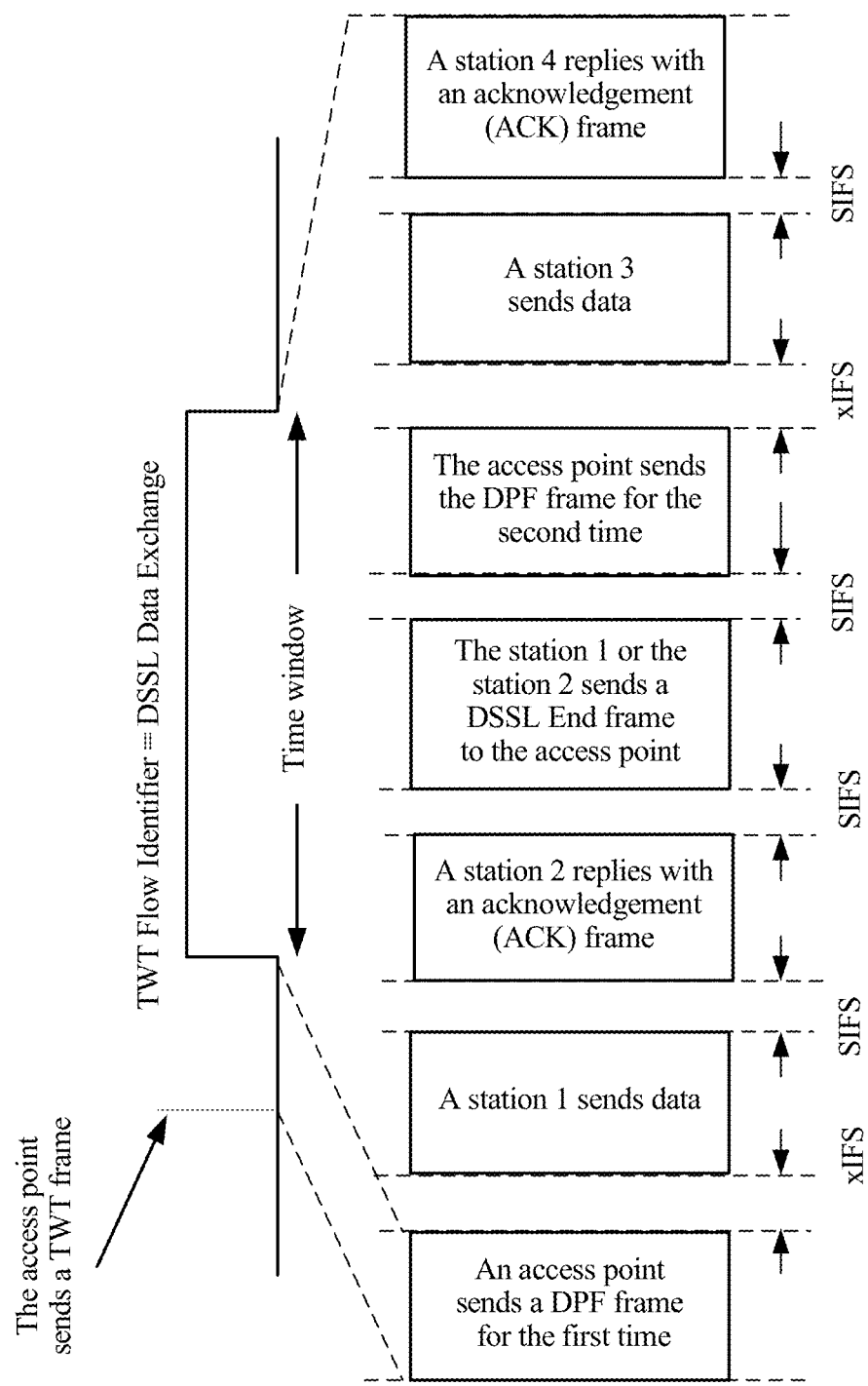
FIG. 10 is a schematic diagram of a device-to-device communication process according to an embodiment of the present invention.

Because a channel changes, a device-to-device communication requirement changes, or the like, the resource allocated by the access point to the stations performing device-to-device communication may be greater than a resource actually occupied for device-to-device communication. This may cause a resource waste, and an idle channel may even be occupied by another station. Therefore, in this embodiment of the present invention, if the resource occupied by the stations to perform device-to-device communication is greater than the resource allocated by the access point, when current device-to-device communication ends, the stations may send a device-to-device communication end (DSSL End) frame to the access point, and the DSSL End frame is used to indicate that the current device-to-device communication of the stations ends, so that after receiving the DSSL End frame, the access point adjusts resource scheduling in time, for example, as illustrated in a device-to-device communication process in FIG. 10.

In this embodiment of the present invention, the access point may choose to stay in a dormant state within the time window used for device-to-device communication between stations, and stay in a wakeup state outside the time window, thereby achieving an objective of saving energy of the access point.

Figure 11:
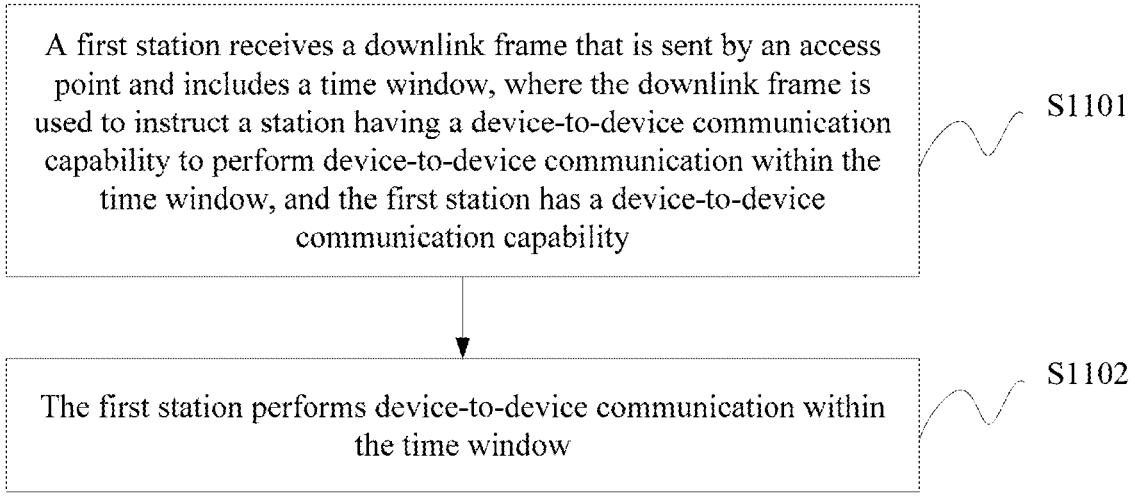
FIG. 11 is a schematic flowchart of a device-to-device communication method according to an embodiment of the present invention.

Corresponding to the device-to-device communication method shown in FIG. 2, as shown in FIG. 11, an embodiment of the present invention provides a device-to-device communication method on a side of a first station, including:

S1101. The first station receives a downlink frame that is sent by an access point and includes a time window, where the downlink frame is configured to instruct a station having a device-to-device communication capability to perform device-to-device communication within the time window, and the first station has a device-to-device communication capability.

S1102. The first station performs device-to-device communication within the time window.

In this embodiment of the present invention, the time window that is determined by the access point and used for device-to-device communication between stations is carried in a Duration field in a MAC header of the downlink frame. For a frame format of the downlink frame received by the first station, refer to content of the embodiment on the side of the access point, and details are not described herein again.

The downlink frame received by the first station further includes any one or a combination of the following:

an identifier of the first station, resource configuration information used to instruct the first station to perform device-to-device communication within the time window, or a type of device-to-device communication performed by the first station within the time window; and the type of device-to-device communication includes DSSL discovery, DSSL link setup, and DSSL data exchange.

Before receiving the downlink frame sent by the access point, the first station may further receive a target wake time TWT frame sent by the access point. The TWT frame is used to instruct the first station to receive, at a preset moment, the downlink frame sent by the access point, so that the first station receives, at the preset moment, the downlink frame sent by the access point, and further obtains the time window. Alternatively, the first station receives the TWT frame sent by the access point, and the TWT frame indicates a starting moment and a time length of the time window, so that the first station wakes up according to the starting moment of the time window, and performs device-to-device communication within the time window.

After receiving the downlink frame sent by the access point, the first station may send an uplink frame in response to the downlink frame, and the uplink frame includes the time window. In some embodiments, the time window is carried in a field in a MAC header of the uplink frame.

In this way, another station that does not receive the downlink frame can learn the time window according to the uplink frame, and further set an NAV and the like according to the time window. For example, the downlink frame is a DTS frame and the uplink frame is a DTS frame.

For specific descriptions, refer to content of the embodiment on the side of the access point, and details are not described herein again.

In the prior art, a station having a device-to-device communication capability contends for a channel according to a manner stipulated in the conventional 802.11 series of standards, that is, a CSMA mechanism, to perform data transmission. As stipulated in the conventional 802.11 series of standards, a backoff time used for channel contention by a station is at least a distributed inter-frame space (Distributed Inter-frame Space, DIFS), and the DIFS=34 µs. The station randomly selects, according to a different service type, one of a maximum backoff window or a minimum backoff window to perform a current backoff process during channel contention.

By means of the technical solution provided in this embodiment of the present invention, channel contention overheads and a quantity of stations participating in channel contention can be effectively reduced. Therefore, in some embodiments, in this embodiment of the present invention, after learning the time window, the first station contends for a channel within the time window by using a preset backoff time and a preset backoff window. The preset backoff time is greater than a short inter-frame space (Short Inter-Frame Space, SIFS), and is less than a DIFS. Compared with the prior art, in this embodiment of the present invention, a backoff time is reduced. The first station may always choose to perform random backoff and participate in channel contention according to an access category voice (Access Category Voice, AC_VO) configuration having a highest priority. That is, a minimum backoff window is 3 and a maximum backoff window is 15. The first station performs device-to-device communication within the time window on the channel obtained by means of contention.

In some embodiments, in this embodiment of the present invention, a station performing device-to-device communication within the time window performs device-to-device communication in a power control manner. That is, a data exchange is performed, by using a transmit power less than an uplink transmit power or less than a downlink transmit power, between stations performing device-to-device communication. In this way, the station performing device-to-device communication can perform channel resource multiplexing transmission by listening to a channel and controlling a power of the station. That is, a pair of different stations performing device-to-device communication may transmit data concurrently on a same channel resource, provided that interference between the pair of stations satisfies a transmission-allowable condition.

This embodiment of the present invention further defines a communications frame. The communications frame is a communications frame that is sent by the first station to a peer station in a process of performing device-to-device communication within the time window. The communications frame may include information used to indicate a frame type of the communications frame.

Figure 12A:
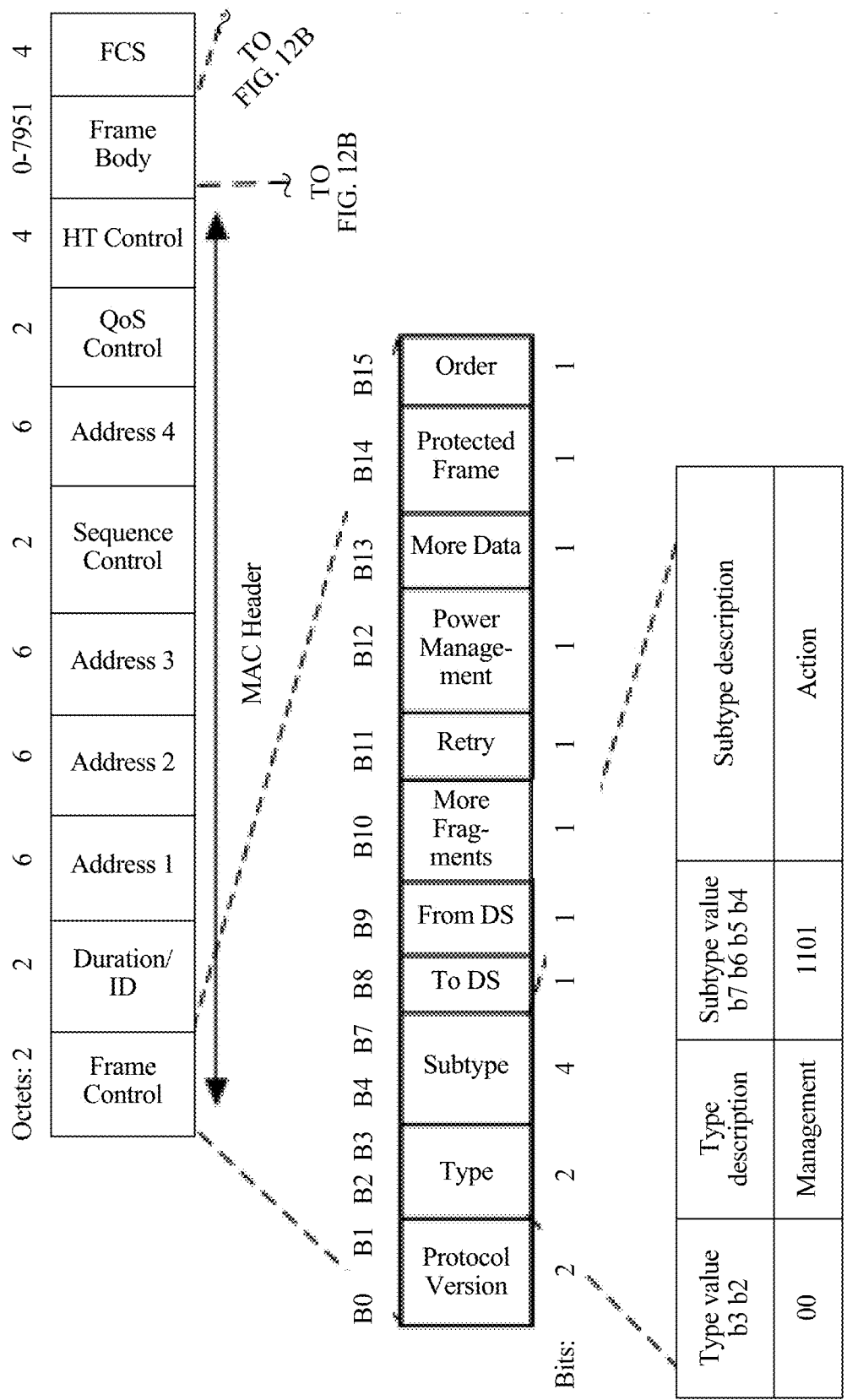
FIG. 12A and FIG. 12B are schematic diagrams of a frame structure according to an embodiment of the present invention.
Figure 12B:
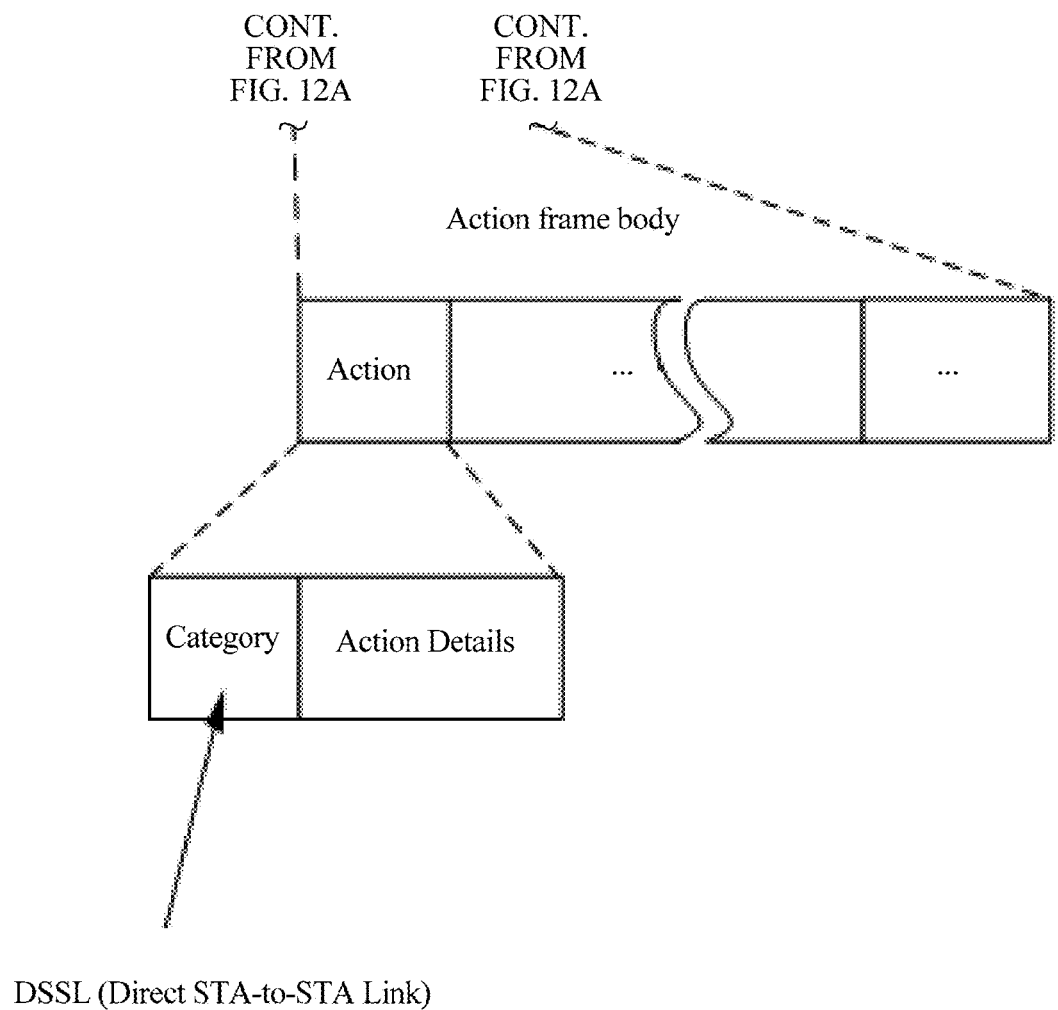

Using a frame structure of the communications frame shown in FIG. 12A and FIG. 12B as an example, FIG. 12A and FIG. 12B show an action frame (Action Frame). In a frame control (Frame Control) field in a MAC Header, the downlink frame is defined as a management frame (Management Frame) by using a frame type (Type Value), and the downlink frame is further defined as an Action Frame by using a frame subtype (Subtype value). In this way, content of a frame body of the Action Frame is content carried in a frame body (Frame Body) field.

The Frame Body field includes a category (Category) field and an action details (Action Details) field. In this embodiment of the present invention, the Category field is defined as DSSL, and is used to indicate that the communications frame is a device-to-device communication frame. The Action Details field is used to indicate a specific information field included in this type of Action Frame.

In the frame structure shown in FIG. 12A and FIG. 12B, in addition to the foregoing English texts whose Chinese meanings have been indicated, Chinese meanings of other English texts are shown in Table 2.

TABLE 2

| English | Chinese meaning |
| --- | --- |
| Address 1, 2, 3, 4 | Address 1, 2, 3, 4 |
| Sequence Control | Sequence control |
| QoS Control (Quality of Service Control) | Quality of service control |
| HT Control (High Throughput Control) | High throughput control |
| FCS (Frame Check Sequence) | Frame check sequence |
| Protocol Version | Protocol version |
| To DS (To Distributed System) | To distributed system |
| From DS | From distributed system |
| More Fragments | More fragments |
| Retry | Retry |
| Power Management | Power management |

TABLE 2-continued

| English | Chinese meaning |
| --- | --- |
| More Data | More data |
| Protected Frame | Protected frame |
| Order | Order |
| Type value | Type value |
| Type description | Type description |

Figure 13:
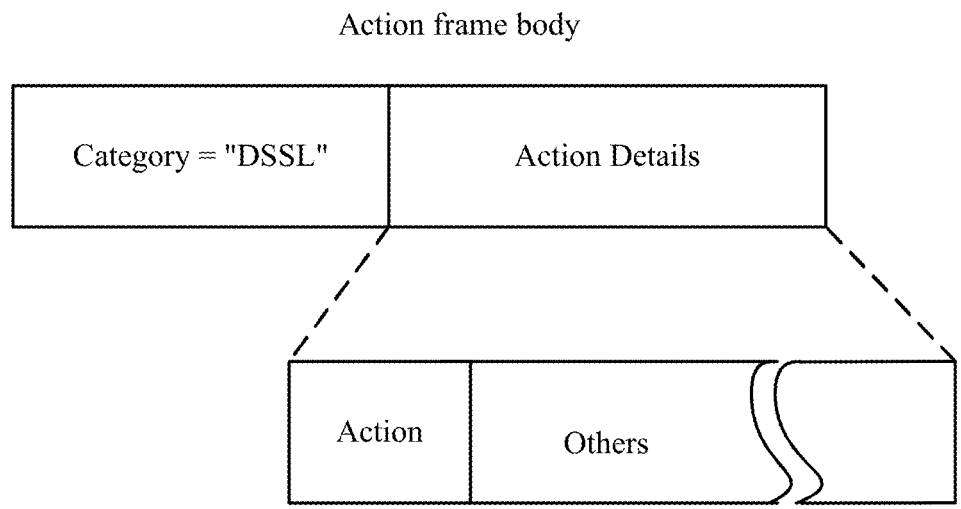
FIG. 13 is a schematic structural diagram of an Action Details field according to an embodiment of the present invention.

Further, using FIG. 13 as an example, the Action Details field is divided into an Action field and an others (Others) information field that is carried in the Action field. The Action field is used to indicate a frame type of the device-to-device communication frame. The frame type of the device-to-device communication frame includes a DSSL link setup request frame, a DSSL link setup response frame, a DSSL link teardown frame, a DSSL discovery frame, and the like. For the frame type of the device-to-device communication frame, refer to Table 3.

TABLE 3

| Action Field value | Meaning |
| --- | --- |
| 0 | DSSL Setup Request |
| 1 | DSSL Setup Response |
| 2 | DSSL Setup Confirm |
| 3 | DSSL Teardown |
| 4 | DSSL Discovery |
| 5-255 | Reserved |

The Others information field is used to carry information related to the Action field. For example, a definition of the Category field indicates that the communications frame is a DSSL frame, the Action field indicates that the communications frame is a DSSL link setup request frame, and the Others information field may be used to carry at least one type of information (Information) from Order=3 to 18 in Table 4. Notes (Notes) are explanations and descriptions of corresponding Information.

TABLE 4

| Order | Information | Notes |
| --- | --- | --- |
| 1 | Category | The Category field is set to the value for DSSL. |
| 2 | DSSL Action | The Action field is set to 0, representing DSSL Setup Request |
| 3 | Dialog Token | The Dialog Token field contains a unique nonzero value for the conversation between the STAs involved in this request. The Dialog Token is specified in 8.4.1.12. |
| 4 | Capability | The Capability field indicates the capabilities of the STA. The Capability field is defined in 8.4.1.4. |
| 5 | Supported rates | The Supported Rates element indicates the rates that are supported by the STA. The Supported Rates element is defined in 8.4.2.3. |
| 6 | Country | The Country element is present when dot11MultiDomainCapabilityActivated is true or dot11SpectrumManagementRequir |
| 7 | Extended supported rates | The Extended Supported Rates element is present whenever there are more than eight supported rates, and it is optionally present otherwise. The Extended Supported Rates element is defined in 8.4.2.15. |
| 8 | Supported Channels | The Supported Channels element is present if the DSSL channel switching capability field is equal to 1. The Supported Channels element is defined in 8.4.2.20. |
| 9 | Extended Capabilties | The Extended Capabilities element is optionally present if any of the fields in this element are nonzero. The Extended Capabilities element is defined in 8.4.2.29. |
| 10 | QoS Capability | The QoS Capability element is present when dot11QosOptionImplemented is true and not present otherwise. The QoS Capability element is defined in 8.4.2.37. |
| 11 | DSSL Timeout Value | The Timeout Interval element contains the TPK Key Lifetime and is present if security is required on the direct link. The Timeout Interval element is defined in 8.4.2.51. |
| 12 | Supported Operating Classes | The Supported Operating Classes element is present if the DSSL channel switching capability field is equal to 1. The Supported Operating Classes element is defined in 8.4.2.56 (optional). |
| 13 | HT Capabilities | The HT Capabilities element is present when dot11HighThroughputOptionImplemented is true. |
| 14 | 20/40 BSS Coexistence | The 20/40 BSS Coexistence element is defined in 8.4.2.62. The 20/40 BSS Coexistence element is optionally present. |
| 15 | VHT Capabilities | The VHT Capabilities element is present if the dot11VHTOptionImplemented is true. |
| 16 | HE Capabilities | The HE Capabilities element is present if the dot11HEOptionImplemented is true. |
| 17 | Destination MAC Address | |
| 18 | Source MAC Address | |

Similarly, a definition of the Category field indicates that the communications frame is a DSSL frame, the Action field indicates that the communications frame is a DSSL link setup response frame, and the Others information field may be used to carry at least one type of information (Information) from Order=3 to 18 in Table 5. Notes are explanations and descriptions of corresponding Information.

TABLE 5

| Order | Information | Notes |
| --- | --- | --- |
| 1 | Category | The Category field is set to the value for DSSL. |
| 2 | DSSL Action | The Action field is set to 0, representing DSSL Setup Request |
| 3 | Stauts Code | |
| 4 | Dialog Token | The Dialog Token field contains a unique nonzero value for the conversation between the STAs involved in this request. The Dialog Token is specified in 8.4.1.12. |
| 5 | Capability | The Capability field indicates the capabilities of the STA. The Capability field is defined in 8.4.1.4. |
| 6 | Supported rates | The Supported Rates element indicates the rates that are supported by the STA. The Supported Rates element is defined in 8.4.2.3. |
| 7 | Country | The Country element is present when dot11MultiDomainCapabilityActivated is true or dot11SpectiumManagementRequir |
| 8 | Extended supported rates | The Extended Supported Rates element is present whenever there are more than eight supported rates, and it is optionally present otherwise. The Extended Supported Rates element is defined in 8.4.2.15. |
| 9 | Supported Channels | The Supported Channels element is present if the DSSL channel switching capability field is equal to 1. The Supported Channels element is defined in 8.4.2.20. |
| 10 | Extended Capabilties | The Extended Capabilities element is optionally present if any of the fields in this element are nonzero. The Extended Capabilities element is defined in 8.4.2.29. |
| 11 | QoS Capability | The QoS Capability element is present when dot11QosOptionImplemented is true and not present otherwise. The QoS Capability element is defined in 8.4.2.37. |
| 12 | Supported Operating Classes | The Supported Operating Classes element is present if the DSSL channel switching capability field is equal to 1. The Supported Operating Classes element is defined in 8.4.2.56 (optional). |
| 13 | HT Capabilities | The HT Capabilities element is present when dot11HighThroughputOptionImplemented is true. |
| 14 | 20/10 BSS Coexistence | The 20/40 BSS Coexistence element is defined in 8.4.2.62. The 20/40 BSS Coexistence element is optionally present. |
| 15 | VHT Capabilities | The VHT Capabilities element is present if the dot11VHTOptionImplemented is true. |
| 16 | HE Capabilities | The HE Capabilities element is present if the dot11HEOptionImplemented is true. |
| 17 | Destination MAC Address | |
| 18 | Source MAC Address | |

Similarly, a definition of the Category field indicates that the communications frame is a DSSL frame, the Action field indicates that the communications frame is a DSSL link setup acknowledgement frame, and the Others information field may be used to carry at least one type of information (Information) from Order=3 to 20 in Table 6. Notes are explanations and descriptions of corresponding Information.

TABLE 6

| Order | Information | Notes |
| --- | --- | --- |
| 1 | Category | The Category field is set to the value for DSSL. |
| 2 | DSSL Action | The Action field is set to 0, representing DSSL Setup Request |
| 3 | DSSL-ID | A value assigned by an AP for DSSL originating STA and DSSL responding STA |
| 4 | Stauts Code | |
| 5 | Dialog Token | The Dialog Token field contains a unique nonzero value for the conversation between the STAs involved in this request.The Dialog Token is specified in 8.4.1.12. |
| 6 | Capability | The Capability field indicates the capabilities of the STA. The Capability field is defined in 8.4.1.4. |
| 7 | Supported rates | The Supported Rates element indicates the rates that are supported by the STA. The Supported Rates element is defined in 8.4.2.3. |
| 8 | Country | The Country element is present when dot11MultiDomainCapabilityActivated is true or dot11SpectrumManagementRequir |
| 9 | Extended supported rates | The Extended Supported Rates element is present whenever there are more than eight supported rates, and it is optionally present otherwise. The Extended Supported Rates element is defined in 8.4.2.15. |
| 10 | Supported Channels | The Supported Channels element is present if the DSSL channel switching capability field is equal to 1. The Supported Channels element is defined in 8.4.2.20. |
| 11 | Extended Capabilties | The Extended Capabilities element is optionally present if any of the fields in this element are nonzero. The Extended Capabilities element is defined in 8.4.2.29. |
| 12 | QoS Capability | The QoS Capability element is present when dot11QosOptionImplemented is true and not present otherwise. The QoS Capability element is defined in 8.4.2.37. |
| 13 | Supported Operating Classes | The Supported Operating Classes element is present if the DSSL channel switching capability field is equal to 1. The Supported Operating Classes element is defined in 8.4.2.56 (optional). |
| 14 | HT Capabilities | The HT Capabilities element is present when dot11HighThroughputOptionImplemented is true. |
| 15 | 20/40 BSS Coexistence | The 20/40 BSS Coexistence element is defined in 8.4.2.62. The 20/40 BSS Coexistence element is optionally present. |
| 16 | VHT Capabilities | The VHT Capabilities element is present if the dot11VHTOptionImplemented is true. |

TABLE 6-continued

| Order | Information | Notes |
|---|---|---|
| 17 | HE Capabilities | The HE Capabilities element is present if the dot11HEOptionImplemented is true. |
| 18 | Operating Mode Notification | The Operating Mode Notification element is optionally present if the DSSL Setup Request frame contained an Extended Capabilities element with the Operating Mode Notification field is equal to 1. |
| 19 | Destination MAC Address | |
| 20 | Source MAC Address | |

Similarly, a definition of the Category field indicates that the communications frame is a DSSL frame, the Action field indicates that the communications frame is a DSSL link teardown frame, and the Others information field may be used to carry at least one type of information (Information) from Order=3 to 5 in Table 7. Notes are explanations and descriptions of corresponding Information.

TABLE 7

| Order | Information | Notes |
|---|---|---|
| 1 | Category | The Category field is set to the value for DSSL. |
| 2 | DSSL Action | The Action field is set to 0, representing DSSL Setup Request |
| 3 | Reason Code | |
| 4 | Destination MAC Address | |
| 5 | Source MAC Address | |

Similarly, a definition of the Category field indicates that the communications frame is a DSSL frame, the Action field indicates that the communications frame is a DSSL discovery frame, and the Others information field may be used to carry at least one type of information (Information) from Order=3 to 6 in Table 8. Notes are explanations and descriptions of corresponding Information.

TABLE 8

| Order | Information | Notes |
|---|---|---|
| 1 | Category | The Category field is set to the value for DSSL. |
| 2 | DSSL Action | The Action field is set to 0, representing DSSL Setup Request |
| 3 | Dialog Token | The Dialog Token field contains a unique nonzero value for the conversation between the STAs involved in this request. The Dialog Token is specified in 8.4.1.12. |
| 4 | AID | |
| 5 | Destination MAC Address | |
| 6 | Source MAC Address | |

Figure 14:
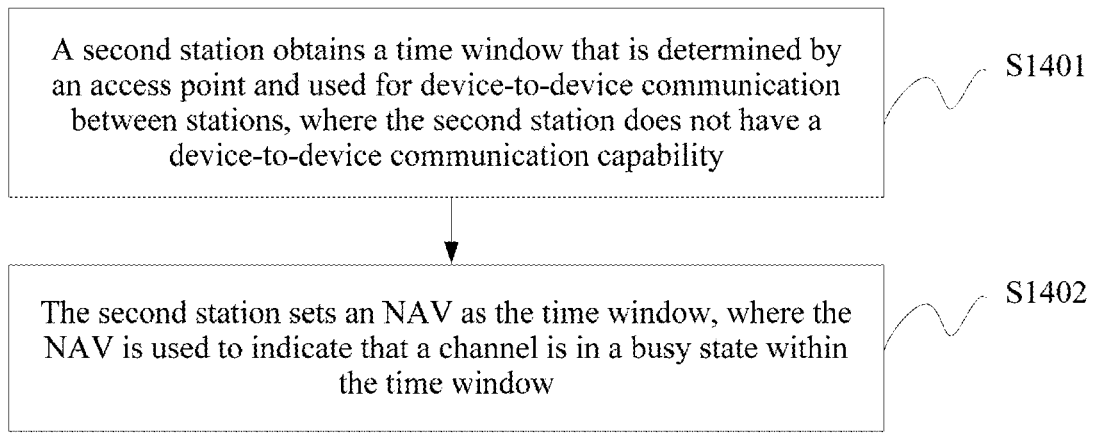
FIG. 14 is a schematic flowchart of a network allocation vector NAV setting method according to an embodiment of the present invention.

Corresponding to the device-to-device communication method shown in FIG. 2, as shown in FIG. 14, an embodiment of the present invention provides a network allocation vector NAV setting method on a side of a second station, including:

S1401. The second station obtains a time window that is determined by an access point and used for device-to-device communication between stations, where the second station does not have a device-to-device communication capability.

S1402. The second station sets an NAV as the time window, where the NAV is used to indicate that a channel is in a busy state within the time window.

The second station may obtain, by using the following two methods, the time window that is determined by the access point and used for device-to-device communication between stations.

Method 1. The second station receives a downlink frame that is sent by the access point and includes the time window.

The time window is carried in a duration field in a Medium Access Control MAC header of the downlink frame.

In some embodiments, the downlink frame is a target wake time TWT frame, a DTS frame, a DPF frame, a beacon frame, or the like.

For specific content, refer to content of the embodiment on the side of the access point, and details are not described herein again.

Method 2. The second station listens to an uplink frame that is sent by a station having a device-to-device communication capability to the access point, where the uplink frame includes the time window.

The time window is carried in a duration field in a Medium Access Control MAC header of the uplink frame.

In some embodiments, the uplink frame is a CTD frame, or the like.

For specific content, refer to content of the embodiment on the side of the access point, and details are not described herein again.

As shown in FIG. 4, the access point sends a DSSL polling (DSSL Polling Frame, DPF) frame. The DPF frame may use a frame format of one of a management frame, a control frame, or a data frame. The DPF frame carries the time window that is determined by the access point and used for device-to-device communication between stations. A first station having a device-to-device communication capability may learn the time window (which may be defined as a DSSL Period) according to the DPF frame sent by the access point, and perform device-to-device communication within the time window.

The DPF frame sent by the access point may further carry an identifier (DSSL Period Identifier, DSSL Period ID) used to indicate the time window used for device-to-device communication between stations. The DSSL Period ID is used to indicate the identifier of the time window used for device-to-device communication between stations, so that after receiving the DPF frame, the station determines, according to the DSSL Period ID, whether to perform device-to-device communication within the time window. For example, the DSSL Period ID may indicate a communication link identifier (DSSL Link ID) of device-to-device communication. Specifically, after a station 1 sets up a device-to-device communication link to another station 2, the station 1 and the station 2 obtain a same DSSL Link ID used to identify the device-to-device communication link set up between the station 1 and the station 2. If the DSSL Link ID obtained by the station 1 or the station 2 matches the DSSL Period ID (DSSL Link ID) carried in the DPF frame sent by the access point, the station 1 or the station 2 determines to perform device-to-device communication within the time window carried in the DPF frame sent by the access point. Further, if the DSSL Link ID does not match the DSSL Period ID, the station 1 or the station 2 may stay silent and does not perform communication transmission according to a time of the time window carried in the DPF frame sent by the access point. For another example, the DSSL Period ID may further be an identifier indicating a service type, to indicate that a station performs specified device-to-device communication within the time window, for example, a voice (Voice) service, a video (Video) service, a background (Background) service, or a best-effort (Best-effort) service type. A value of the DSSL Period ID may be 8 bits (8 bits).

In an example, a station sends a DPF request frame (Request). The DPF request frame is used to request a time window from an access point, the time window is used for device-to-device communication between stations, and the DPF request frame may use a frame format of one of a management frame, a control frame, or a data frame. The DPF request frame may carry a DSSL Period ID of the station, or may carry a length of a time window that is expected by the station and used for device-to-device communication. In some embodiments, before the access point sends the DPF frame, the access point may reply, with a DPF response frame (Response), to the station sending the DPF request frame, and the DPF response frame carries a DSSL Period ID consistent with that in the DPF request frame.

In an implementation, the DPF frame is a management frame whose subtype is an action frame (Action Frame) in management frames. An information element (Information Element IE) is defined as a DSSL Period Setup element, and the DSSL Period Setup element is carried in the DPF frame. A structure of the DSSL Period Setup element is shown in Table 9.

TABLE 9

Structure of a DSSL Period Setup element

|  | Element ID | Length | DSSL Period | DSSL Period Identifier | Specific Service Identifier |
|---|---|---|---|---|---|
| Octets: | 1 | 1 | 2 | 1 | 2 |

In another implementation, an information element (Information Element, IE) is a DSSL Period Request element, and the DSSL Period Setup element is carried in the DPF request frame. A structure of the DSSL Period Request element is shown in Table 10.

TABLE 10

Structure of a DSSL Period Request element

|  | Element ID | Length | Dialog Token | DSSL Period Offset | DSSL Period Duration | DSSL Period Interval | Repetition Count | Vender Specific Service Identifier |
|---|---|---|---|---|---|---|---|---|
| Octets: | 1 | 1 | 2 | 2 | 2 | 2 | 1 | 2 |

In another implementation, an information element (Information Element, IE) is a DSSL Period Response element, and the DSSL Period Response element is carried in the DPF response frame. A structure of the DSSL Period Response element is shown in Table 11.

TABLE 11

Structure of a DSSL Period Response element

|  | Element ID | Length | Dialog Token | DSSL Period Identifier | Status Code |
|---|---|---|---|---|---|
| Octets: | 1 | 1 | 2 | 1 | 2 |

In the foregoing table 9, table 10, and table 11, a DSSL Period Offset field is used to represent an offset time amount between a current IE and an initial DSSL Period. A DSSL Period Interval field is used to represent a time difference between two adjacent DSSL Periods. A Vender Specific Service Identifier field is used to indicate identifiers defined by a device vendor for different applications. Content and meanings of Element ID, Length, Dialog Token, Status Code, and Repetition Count fields are consistent with content and meanings of IEs defined in an existing IEEE 802.11 series of standards.

The embodiments of the present invention provide the device-to-device communication method, the access point, and the first station, so that the first station having a device-to-device communication capability performs device-to-device communication within the time window indicated by the access point, thereby avoiding channel contention between another station and the first station. In one aspect, contention overheads generated due to channel contention are reduced, device-to-device communication efficiency is improved, and a system throughput rate is improved. In another aspect, station energy consumption caused by frequent continuous channel contention is avoided, and an objective of saving station energy is achieved.

Figure 15:
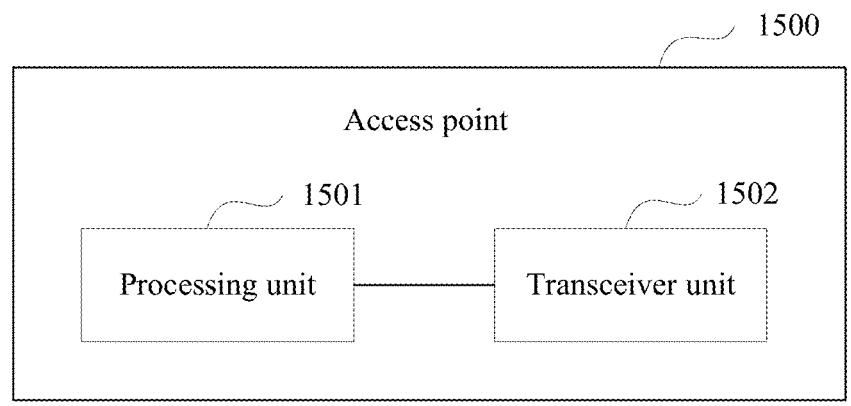
FIG. 15 is a schematic structural diagram of an access point according to an embodiment of the present invention.

Based on the foregoing embodiments, an embodiment of the present invention further provides an access point 1500. The access point may use the method provided in the embodiment corresponding to FIG. 2. As shown in FIG. 15, the access point 1500 includes a processing unit 1501 and a transceiver unit 1502.

The processing unit 1501 is configured to determine a time window used for device-to-device communication between stations.

The transceiver unit 1502 is configured to send a downlink frame including the time window determined by the processing unit 1501, where the downlink frame is configured to instruct a station having a device-to-device communication capability to perform device-to-device communication within the time window.

In some embodiments, the downlink frame further includes any one or a combination of the following:

an identifier indicating a station performing device-to-device communication within the time window, resource configuration information of the time window, or a type of device-to-device communication performed within the time window; and the type of device-to-device communication includes DSSL discovery, DSSL link setup, and DSSL data exchange.

In some embodiments, the transceiver unit 1502 is further configured to:

send a target wake time TWT frame, where the TWT frame is used to instruct a station having a device-to-device communication capability to receive, at a preset moment, the downlink frame sent by the transceiver unit 1502.

In some embodiments, the processor is further configured to:

control the access point to stay in a dormant state within the time window.

Figure 16:
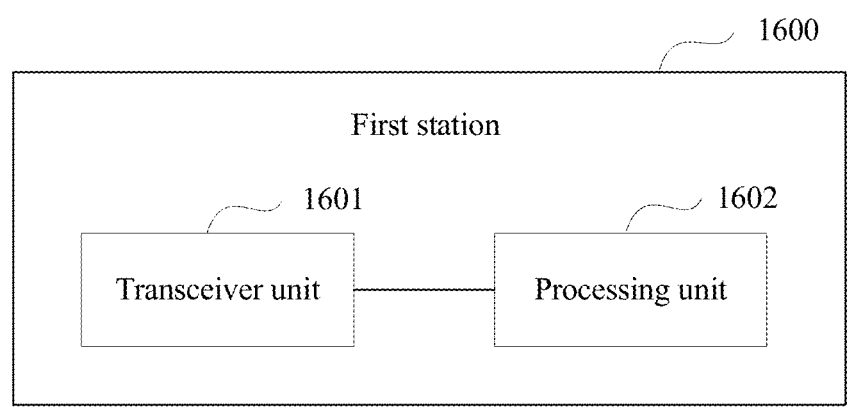
FIG. 16 is a schematic structural diagram of a first station according to an embodiment of the present invention.

Based on the foregoing embodiments, an embodiment of the present invention further provides a first station. The first station may use the method provided in the embodiment corresponding to FIG. 11. As shown in FIG. 16, the first station 1600 includes a transceiver unit 1601 and a processing unit 1602.

The transceiver unit 1601 is configured to receive a downlink frame that is sent by an access point and includes a time window, where the downlink frame is configured to instruct a station having a device-to-device communication capability to perform device-to-device communication within the time window, and the first station has a device-to-device communication capability.

The processing unit 1602 is configured to control the first station to perform device-to-device communication within the time window received by the transceiver unit 1601.

In some embodiments, the downlink frame further includes any one or a combination of the following:

an identifier of the first station, resource configuration information used to instruct the first station to perform device-to-device communication within the time window, or a type of device-to-device communication performed by the first station within the time window; and the type of device-to-device communication includes DSSL discovery, DSSL link setup, and DSSL data exchange.

In some embodiments, the transceiver unit 1601 is further configured to:

receive a target wake time TWT frame sent by the access point, where the TWT frame is used to instruct the transceiver unit 1601 to receive, at a preset moment, the downlink frame sent by the access point.

In some embodiments, when the first station performs device-to-device communication within the time window, the processing unit 1602 is further configured to:

contend for a channel within the time window by using a preset backoff time and a preset backoff window, where the preset backoff time is greater than a short inter-frame space SIFS, and is less than a distributed inter-frame space DIFS; and control the first station to perform device-to-device communication within the time window on the channel obtained by means of contention.

In some embodiments, when the first station performs device-to-device communication within the time window, the transceiver unit 1601 is further configured to:

send a communications frame to a peer station performing device-to-device communication with the first station, where the communications frame includes information used to indicate a frame type of the communications frame.

In some embodiments, when the first station performs device-to-device communication within the time window, the transceiver unit 1601 is further configured to:

send a device-to-device communication end frame to the access point, where the device-to-device communication end frame is used to indicate that current device-to-device communication of the first station ends.

Figure 17:
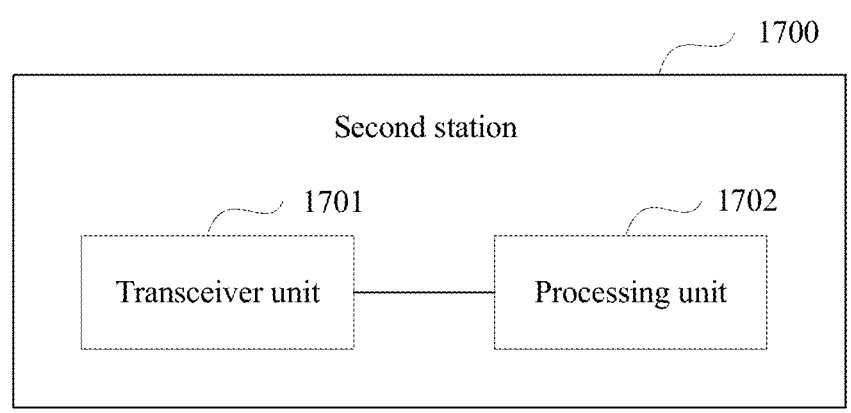
FIG. 17 is a schematic structural diagram of a second station according to an embodiment of the present invention.

Based on the foregoing embodiments, an embodiment of the present invention further provides a second station. The second station may be configured to perform the method provided in the embodiment corresponding to FIG. 14. As shown in FIG. 17, the second station 1700 includes a transceiver unit 1701 and a processing unit 1702.

The transceiver unit 1701 is configured to obtain a time window that is determined by an access point and used for device-to-device communication between stations, where the second station does not have a device-to-device communication capability.

The processing unit 1702 is configured to set an NAV as the time window obtained by the transceiver unit 1701, where the NAV is used to indicate that a channel is in a busy state within the time window.

In some embodiments, the transceiver unit 1701 is specifically configured to:

receive a downlink frame that is sent by the access point and includes the time window.

In some embodiments, the transceiver unit 1701 is specifically configured to:

listen to an uplink frame that is sent by a station having a device-to-device communication capability to the access point, where the uplink frame includes the time window.

It should be noted that unit division in the embodiments of the present invention is an example, and is merely logical function division, and there may be another division manner during actual implementation. In addition, function units in the embodiments of this application may be integrated into one processing unit, or each unit may physically exist alone, or two or more units may be integrated into one unit. The integrated unit may be implemented in a form of hardware, or may be implemented in a form of a software function unit.

When the integrated unit is implemented in the form of a software function unit, and is sold or used as an independent product, the integrated unit may be stored in a computer readable storage medium. Based on such understanding, the technical solutions of this application or a part contributing to the prior art, or all or a part of the technical solutions may be represented in a form of a software product. The computer software product is stored in a storage medium, and includes a plurality of instructions used to enable one computer device (which may be a personal computer, a server, a network device, or the like) or a processor (processor) to perform all or some steps of the method in the embodiments of the present invention. The foregoing storage medium includes various media that can store program code, for example, a USB flash drive, a removable hard disk, a read-only memory (ROM, Read-Only Memory), a random access memory (RAM, Random Access Memory), a magnetic disk, or an optical disc.

Figure 18:
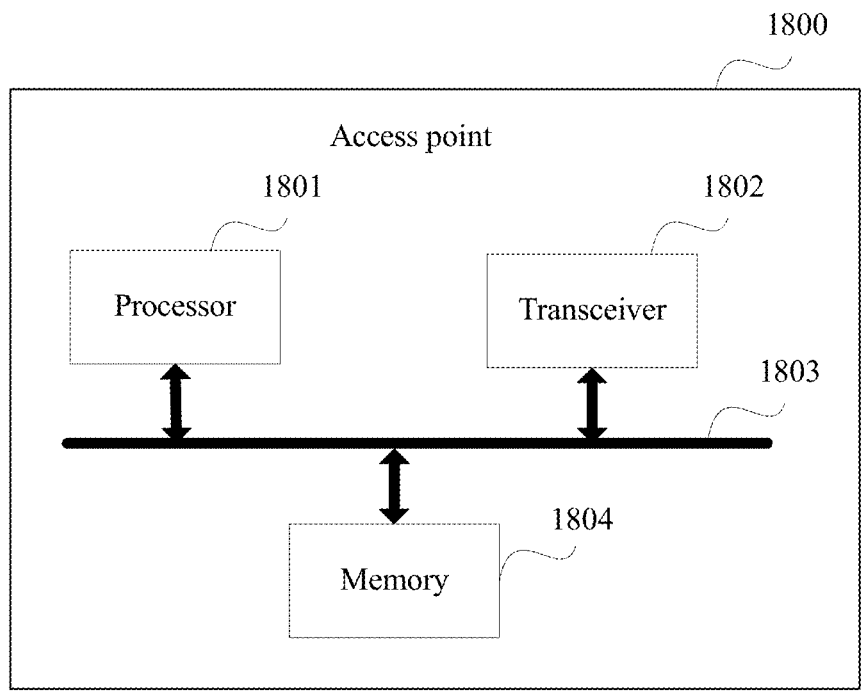
FIG. 18 is a schematic structural diagram of an access point according to an embodiment of the present invention.

Based on the foregoing embodiments, an embodiment of the present invention further provides an access point. The access point may use the method provided in the embodiment corresponding to FIG. 2, and may be a device the same as the access point shown in FIG. 15. As shown in FIG. 18, the access point 1800 includes a processor 1801, a transceiver 1802, a bus 1803, and a memory 1804.

The processor 1801, the transceiver 1802, and the memory 1804 are interconnected by using the bus 1803. The bus 1803 may be a peripheral component interconnect (peripheral component interconnect, PCI for short) bus, an extended industry standard architecture (extended industry standard architecture, EISA for short) bus, or the like. The bus may be divided into an address bus, a data bus, a control bus, or the like. For ease of description, in FIG. 18, only one bold line is used for representation, but it does not mean that there is only one bus or one type of bus.

The processor 1801 corresponds to the processing unit 1501 in FIG. 15, and the transceiver 1802 corresponds to the transceiver unit 1502 in FIG. 15. The access point 1800 further includes the memory 1804, configured to store a program, and the like. Specifically, the program may include program code, and the program code includes a computer operation instruction. The memory 1804 may include a random access memory (random access memory, RAM), or may include a non-volatile memory (non-volatile memory), for example, at least one magnetic disk memory. The processor 1801 performs the application program stored in the memory 1804, to implement the device-to-device communication method.

Figure 19:
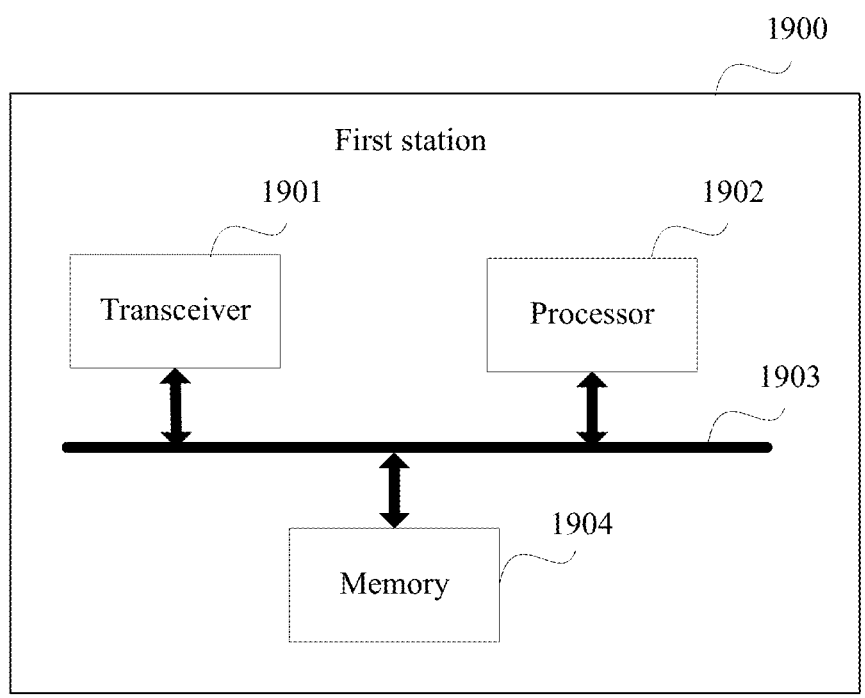
FIG. 19 is a schematic structural diagram of a first station according to an embodiment of the present invention.

Based on the foregoing embodiments, an embodiment of the present invention further provides a first station. The first station may use the method provided in the embodiment corresponding to FIG. 11, and may be a device the same as the first station shown in FIG. 16. As shown in FIG. 19, the first station 1900 includes a transceiver 1901, a processor 1902, a bus 1903, and a memory 1904.

The transceiver 1901, the processor 1902, and the memory 1904 are interconnected by using the bus 1903. The bus 1903 may be a PCI bus, an EISA bus, or the like. The bus may be divided into an address bus, a data bus, a control bus, or the like. For ease of description, in FIG. 19, only one bold line is used for representation, but it does not mean that there is only one bus or one type of bus.

The transceiver 1901 corresponds to the transceiver unit 1601 in FIG. 16, and the processor 1902 corresponds to the processing unit 1602 in FIG. 16. The first station 1900 further includes the memory 1904, configured to store a program and the like. Specifically, the program may include program code, and the program code includes a computer operation instruction. The memory 1904 may include a RAM, or may include a non-volatile memory, for example, at least one magnetic disk memory. The processor 1902 performs the application program stored in the memory 1904, to implement the device-to-device communication method.

Figure 20:
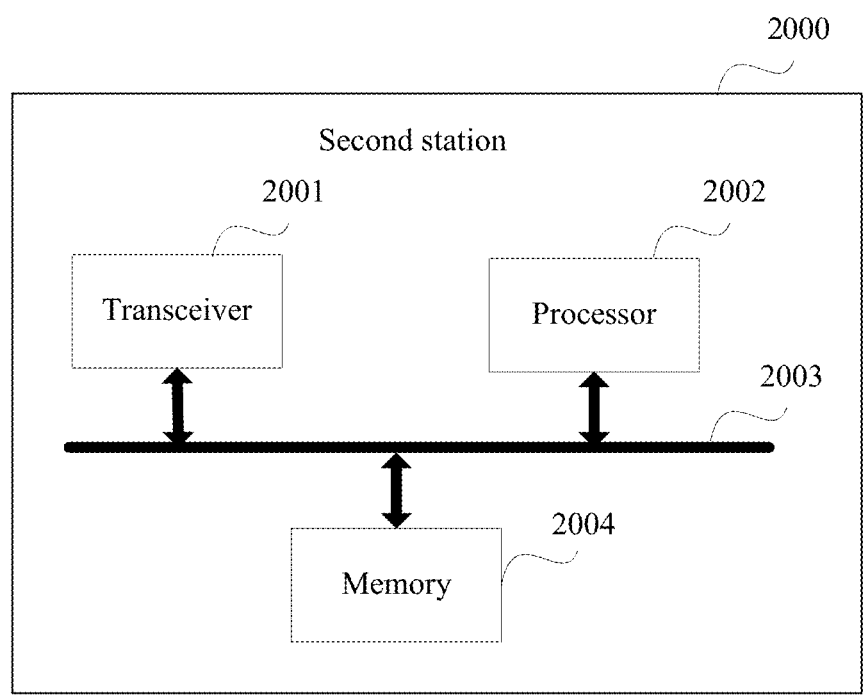
FIG. 20 is a schematic structural diagram of a second station according to an embodiment of the present invention.

Based on the foregoing embodiments, an embodiment of the present invention further provides a second station. The second station may use the method provided in the embodiment corresponding to FIG. 14, and may be a device the same as the second station shown in FIG. 17. As shown in FIG. 20, the second station 2000 includes a transceiver 2001, a processor 2002, a bus 2003, and a memory 2004.

The transceiver 2001, the processor 2002, and the memory 2004 are interconnected by using the bus 2003. The bus 2003 may be a PCI bus, an EISA bus, or the like. The bus may be divided into an address bus, a data bus, a control bus, or the like. For ease of description, in FIG. 20, only one bold line is used for representation, but it does not mean that there is only one bus or one type of bus.

The transceiver 2001 corresponds to the transceiver unit 1701 in FIG. 17, and the processor 2002 corresponds to the processing unit 1702 in FIG. 17. The second station 2000 further includes the memory 2004, configured to store a program and the like. Specifically, the program may include program code, and the program code includes a computer operation instruction. The memory 2004 may include a RAM, or may include a non-volatile memory, for example, at least one magnetic memory. The processor 2002 performs the application program stored in the memory 2004, to implement the NAV setting method.

Although some embodiments of the present invention have been described, persons skilled in the art can make changes and modifications to these embodiments once they learn basic inventive concepts in accordance with the present disclosure. Therefore, the following claims are intended to be construed as to cover the embodiments described herein and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the following claims and their equivalent technologies.

The invention claimed is:

1. A device-to-device communication method, comprising:
   determining, by an access point, a time window used for device-to-device communication between stations (STAs); and
   sending, by the access point, a downlink frame comprising the time window, wherein the downlink frame is configured to instruct a station having a device-to-device communication capability to perform device-to-device communication within the time window; and,
   wherein the downlink frame further comprises a communication link identifier of device-to-device communication, the communication link identifier of device-to-device communication facilitating the STAs to determine to perform device-to-device communication within the time window.

2. The method according to claim 1, wherein the downlink frame comprises any one or a combination of the following:
   an identifier indicating a station performing device-to-device communication within the time window, or resource configuration information of the time window, or a type of device-to-device communication performed within the time window.

3. The method according to claim 2, the type of device-to-device communication comprises direct STA-to-STA link, (DSSL) discovery, DSSL link setup, and DSSL data exchange.

4. The method according to claim 2, the resource configuration information of the time window is configured to indicate a time resource configuration within the time window, time resource configuration comprising:
   a time resource within the time window is divided into multiple sub-time ranges, and multiple pairs of device-to-device communication stations perform device-to-device communication in different sub-time ranges.

5. The method according to claim 1, wherein the time window is carried in a duration field in a Medium Access Control (MAC) header of the downlink frame.

6. A device-to-device communication method, comprising:
   receiving, by a station, a downlink frame comprising a time window used for device-to-device communication between stations, wherein the downlink frame is configured to instruct a station having a device-to-device communication capability to perform device-to-device communication within the time window, wherein the downlink frame further comprises a communication link identifier of device-to-device communication, the communication link identifier of device-to-device communication facilitates the STAs to determine to perform device-to-device communication within the time window; and
   determining, by the station, according to the downlink frame, whether to perform device-to-device communication within the time window.

7. The method according to claim 6, wherein the downlink frame comprises any one or a combination of the following:
   an identifier indicating a station performing device-to-device communication within the time window, or resource configuration information of the time window, or a type of device-to-device communication performed within the time window.

8. The method according to claim 7, the type of device-to-device communication comprises direct STA-to-STA link, (DSSL) discovery, DSSL link setup, and DSSL data exchange.

9. The method according to claim 7, the resource configuration information of the time window is configured to indicate a time resource configuration within the time window, time resource configuration comprising:
a time resource within the time window is divided into multiple sub-time ranges, and multiple pairs of device-to-device communication stations perform device-to-device communication in different sub-time ranges.

10. The method according to claim 6, wherein the time window is carried in a duration field in a Medium Access Control (MAC) header of the downlink frame.

11. A device-to-device communication method, comprising:
sending, by a station, a request frame, the request frame being configured to request a time window for device-to-device communication between stations; the request frame comprises a field configured to indicate the time window expected for device-to-device communication between stations;
receiving, by the station, a response frame responding to the request frame;
performing, by the station, device-to-device communication in the time window, according to the response frame.

12. The method according to claim 11, the request frame comprises a field which is used to identify a link of device-to-device communication.

13. The method according to claim 11, the request frame comprises a dialog token field which is configured to request a type of the response frame.

14. The method according to claim 11, the request frame comprises a direct STA to STA link, (DSSL) period offset field which is configured to request an offset of the first DSSL period from a Target Beacon Transmission Time.

15. The method according to claim 11, the request frame comprises a direct STA-to-STA Link, (DSSL) period interval field configured to request an interval between two consecutive time windows.

16. The method according to claim 11, the request frame comprises a repetition count field configured to request the number of requested time window.

17. A device-to-device communication method, comprising:
receiving, by an access point, a request frame, the request frame being configured to request a time window from an access point, the time window being for device-to-device communication between stations; the request frame comprises a field which is configured to indicate the time window expected for device-to-device communication between stations; and
sending, by the access point, a response frame configured to respond the request frame.

18. The method according to claim 17, the response frame comprises a dialog token field for identifying a type of the response frame.

19. The method according to claim 17, the response frame comprises a status code field for indicating the status of a requested operation.

20. The method according to claim 17, the response frame comprises a direct STA-to-STA link, (DSSL) period identifier field for identifying a link of device-to-device communication.

21. An apparatus, configured at an access point side, comprising a processor and a transmitter coupled to the processor, wherein,
the processor is configured to determine a time window used for device-to-device communication between stations;
the transmitter is configured to send a downlink frame comprising the time window, wherein the downlink frame is configured to instruct a station having a device-to-device communication capability to perform device-to-device communication within the time window, wherein the downlink frame further comprises a communication link identifier of device-to-device communication, the communication link identifier of device-to-device communication is configured to facilitate the STAs to determine to perform device-to-device communication within the time window.

22. An apparatus, configured at a station side, comprising a processor and a receiver coupled to the processor, wherein,
the receiver is configured to receive a downlink frame comprising a time window used for device-to-device communication between stations, wherein the downlink frame is configured to instruct a station having a device-to-device communication capability to perform device-to-device communication within the time window, wherein the downlink frame further comprises a communication link identifier of device-to-device communication, the communication link identifier of device-to-device communication is used to facilitate the STAs to determine to perform device-to-device communication within the time window;
the processor is configured to determine, according to the downlink frame, whether to perform device-to-device communication within the time window.

23. An apparatus, configured at a station side, comprising a processor, a receiver that is coupled to the processor and a transmitter that is coupled to the processor, wherein,
the transmitter is configured to send a request frame, the request frame being configured to request a time window from an access point, the time window being for device-to-device communication between stations; the request frame comprises a field which is configured to indicate the time window expected for device-to-device communication between stations; and
the receiver is configured to receive a response frame which is used to respond the request frame;
the processor is configured to perform device-to-device communication in the time window, according to the response frame.

24. An apparatus, configured at an access point side, comprising a receiver and a transmitter, wherein,
the receiver is configured to receive a request frame, the request frame being configured to request a time window from an access point, the time window being for device-to-device communication between stations; the request frame comprises a field which is configured to indicate the time window expected for device-to-device communication between stations; and
the transmitter is configured to send a response frame which is used to respond the request frame.

* * * * *